(12) United States Patent
Wang

(10) Patent No.: US 6,175,922 B1
(45) Date of Patent: Jan. 16, 2001

(54) ELECTRONIC TRANSACTION SYSTEMS AND METHODS THEREFOR

(75) Inventor: Ynjiun P. Wang, Cupertino, CA (US)

(73) Assignee: eSign, Inc., Cupertino, CA (US)

(*) Notice: Under 35 U.S.C. 154(b), the term of this patent shall be extended for 0 days.

(21) Appl. No.: 09/523,825

(22) Filed: Mar. 13, 2000

Related U.S. Application Data

(63) Continuation-in-part of application No. 09/067,176, filed on Apr. 27, 1998, which is a continuation of application No. 08/759,555, filed on Dec. 4, 1996, now Pat. No. 5,917,913.

(51) Int. Cl.[7] .................................................. H06F 11/30
(52) U.S. Cl. ........................ 713/182; 713/168; 713/169; 380/255; 380/281; 380/283
(58) Field of Search .................... 713/159, 168, 713/169, 182–200, 201; 380/255, 281, 283

(56) References Cited

U.S. PATENT DOCUMENTS

| | | | |
|---|---|---|---|
| 5,373,561 | 12/1994 | Haber et al. | 380/49 |
| 5,416,842 | 5/1995 | Aziz | 380/30 |
| 5,440,633 | 8/1995 | Augustine et al. | 380/23 |
| 5,455,863 | 10/1995 | Brown et al. | 380/23 |
| 5,524,052 | 6/1996 | Augustine et al. | 380/49 |
| 5,548,106 | 8/1996 | Liang et al. | 235/454 |
| 5,623,637 | 4/1997 | Jones et al. | 395/491 |
| 5,724,423 | 3/1998 | Khello | 380/23 |
| 5,917,913 | 6/1999 | Wang | 380/25 |

OTHER PUBLICATIONS

Carol H. Fancher, "In your pocket smartcards," Electronic Payments, IEEE Spectrum, Feb. 1997, Motorola, Inc., pp. 47–53.

Primary Examiner—Thomas R. Peeso
(74) Attorney, Agent, or Firm—Flehr Hohbach Test Albritton & Herbert LLP

(57) ABSTRACT

A method and apparatus is disclosed for approving a transaction request between an electronic transaction system and a portable electronic authorization device (PEAD) carried by a user using an electronic service authorization token. The method includes the steps of receiving at the PEAD first digital data representing the transaction request. The PEAD provides information to the user regarding an ability to approve the transaction request. When the transaction request is approved by the user, the PEAD receives second digital data representing the electronic service authorization token. In one aspect of the invention, the method and apparatus include a remote agent server that provides a bridge between the electronic transaction system and the PEAD. In yet another aspect of the invention, the method and apparatus are used at a point of sale location. Advantages of the invention include the ability to securely and conveniently perform transactions with a portable device.

76 Claims, 16 Drawing Sheets

XYZ Company

Date: 12/31/96
Time: 5:00PM

Invoice List Transaction Number: TR#1234

| No. | Description | Qty | Amount |
|-----|-------------|-----|--------|
| 1.  | 19" Color TV | 1 | 225.00 |
| 2.  | Microwave | 1 | 109.00 |

Total            334.00

Customer credit card information:

\_\_\_\_\_-\_\_\_\_\_-\_\_\_\_\_-\_\_\_\_\_

Address:_____

Tel:_____

( ORDER )  ( PEAD APPROVAL )

FIG. 11

ELECTRONIC TRANSACTION SYSTEMS AND METHODS THEREFOR

RELATED APPLICATIONS

This application is a continuation in part of U.S. Ser. No. 09/067,176 filed Apr. 27, 1998, which is a continuation of U.S. Ser. No. 08/759,555 filed Dec. 4, 1996 now U.S. Pat. No. 5,917,913

BACKGROUND OF THE INVENTION

The present invention relates to methods and apparatus for conducting electronic transactions. More particularly, the present invention relates to portable electronic authorization devices (PEADs) which advantageously and substantially eliminate the security risks associated with prior art techniques of approving transactions between a user and an electronic transaction system.

Electronic transaction systems are known. An electronic transaction system typically permits a user to conduct designated transactions electronically, which substantially improves efficiency and convenience to the user. Examples of electronic transactions include transactions conducted via computer networks, automated teller machines (ATM's), automated point-of-sale systems, automated library systems, and the like. Transactions conducted via computer networks may encompass a wide range of transactions, including exchanging information and data via a computer network popularly known as the Internet, e.g., to make a purchase from a vendor on the network. ATM's typically permit users to conduct financial transactions (such as withdrawals, transfers, deposits, and the like) vis-à-vis a financial institution in an electronic manner. Automated point-of-sale systems may be employed by merchants to permit users to purchase products or services using the users' electronic account, and automated library systems may be employed to permit library users to check out and return library materials. Other examples of electronic transaction systems are readily available in popular literature and are not enumerated herein for brevity sake.

To enhance security to the user's account, electronic transaction systems typically request the user to provide identification data to authenticate himself as the user authorized to approve the proposed transaction or transactions. If the user fails to provide the requested identification data, the proposed transaction or transactions are not authorized and will not be processed. The identification data may be required with each transaction. By way of example, an automated point-of-sale system may require the user to approve a purchase transaction and will accept an approval message only if it is satisfied that the person approving the transaction has furnished adequate identifying data authenticating himself as the person authorized to perform the approval. Alternatively, the identification data may be entered by the user at the start of a session to authenticate himself and enable that user to subsequently perform any number of transactions without Her authentication.

In the prior art, users are typically required to manually enter the identification data into the electronic transaction system for authentication. Typically, the entry of identification data involves typing in a password on a numeric keypad or on a keyboard. The identification data is then compared with data previously stored within the electronic transaction system, and authentication is satisfied when there is a match. As mentioned previously, the transaction or transactions proposed will not be allowed to proceed if there is no match.

Although prior art electronic transaction systems provide some protection from unauthorized access and use of the user's account, there are disadvantages. To illustrate certain disadvantages associated with prior art electronic transaction systems, reference may be made to FIG. 1 herein. FIG. I shows an automated teller machine (ATM) 100, representing the requesting device of an electronic transaction system 102. Electronic transaction system 102 may include, for example, a central database 104 which contains previously-stored identification data and account data of user 106.

To initiate a typical transaction with ATM 100, user 106 first inserts a data card 107, such as a bank card or a credit card, into a card reader 109. Data card 107 typically includes a magnetic stripe that contains the account number and other information related to the user, which may then be read by card reader 109. The data stored in data card 107 enables electronic transaction system 102 to ascertain which account in database 104 user 106 wishes to transact business.

Via a keypad 108 on ATM 100, user 106 may then be able to enter his identification data, e.g., his personal identification number (PIN), to authenticate himself. If the entered identification data matches the identification data stored with the account in database 104 that is identified by data card 107, the user is authenticated and granted access to his account. If there is no match, authentication fails. After authentication, user 106 may be able to, for example, employ a combination of keypad 108 and a screen 110 to withdraw cash from his account, which results in cash being dispensed from ATM 100 and the balance in his account within database 104 correspondingly reduced.

Theoretically, the identification data entered into ATM 100 should be secure. In reality, there are many potential security risks to the identification data in prior art authentication techniques. Since the identification data is not encrypted before being entered into ATM 100, the non-encrypted identification data is vulnerable to unauthorized access and procurement. Encryption of the identification data is not practical in the prior art since it would have been too complicated and/or inconvenient for the user to perform encryption or memorize the encrypted identification data. Unauthorized procurement of the identification data in the prior art may occur, for example, upon entry if it is inadvertently seen by another party, e.g., by another person behind user 106, either on screen 110 or more likely at keypad 108.

Even if encryption is employed on the identification data in the prior art, e.g., prior to transmission from ATM 100 to database 104, the encryption typically occurs within ATM 100 and still requires the entry of non-encrypted identification data from user 106 and the existence of the identification data for some duration of time in ATM 100. Unauthorized access to the identification data may then occur if an unauthorized party is able to gain entry into ATM 100 and intercepts, e.g., via software or hardware implemented in ATM 100, the non-encrypted identification data therein.

Furthermore, if public key cryptography is employed within ATM 100, the storage of the user's private key within ATM 100 renders this private key vulnerable to theft, further exposing the user's account to risk. The stolen password and/or private key may then be employed to allow unauthorized persons to access the user's account to the user's detriment.

In view of the foregoing, there are desired apparatus and methods for conducting transactions with the electronic transaction system while substantially eliminate the risk of unauthorized access to the user's account and unauthorized procurement of the user identification data. Preferably, such an apparatus should be easily portable to permit the user to conveniently and comfortably perform transaction authentication anywhere.

SUMMARY OF THE INVENTION

The present invention relates, in one embodiment, to a method for completing a transaction request pertaining to an electronic transaction conducted over an electronic network having a server and a requesting device. The method includes receiving from the server at the requesting device a transaction program, which includes an executable portion. The method also includes searching, employing the executable portion, for a transaction approval device associated with the requesting terminal. If the transaction approval device is detected, the method includes employing the transaction approval device to approve the transaction request. There is further included transmitting, using the requesting device, an approved transaction request to the server to complete the electronic transaction. The approved transaction request signifies an approval of the transaction request.

In another embodiment, the invention relates to a method for completing a transaction request pertaining to an electronic transaction conducted over an electronic network having a server and a requesting device. The method includes receiving from the server at the requesting device a transaction program, which includes an executable portion. The method also includes receiving from a user at the requesting device transaction approval data, wherein the executable portion of the transaction program includes a first set of codes configured to encrypt the transaction approval data. There is also included encrypting the transaction approval data using the first set of codes. There is further included transmitting, using transaction program, the encrypted transaction approval data to the server to complete the electronic transaction.

In yet another embodiment, the invention relates to a method for completing a transaction request pertaining to an electronic transaction conducted over an electronic network having a server and a requesting device. The method includes receiving from the server at the requesting device a transaction program, which includes an executable portion. There is also included searching, employing the executable portion, for a transaction approval device associated with the requesting terminal. If the transaction approval device is detected, the method further includes employing the transaction approval device to approve the transaction request. If the transaction approval device is not detected, the method also includes employing an input device associated with the requesting device to approve the transaction request. The method additionally includes transmitting, using the requesting device, an approved transaction request to the server to complete the electronic transaction. The approved transaction request signifies an approval of the transaction request by a user via at least one of the transaction approval device and the input device.

These and other advantages of the present invention will become apparent upon reading the following detailed descriptions and studying the various figures of the drawings.

BRIEF DESCRIPTION OF THE DRAWINGS

To facilitate discussion,

FIG. 11 illustrates an exemplary transaction request to facilitate discussion.

DETAILED DESCRIPTION OF THE PREFERRED EMBODIMENTS

Figure 2:
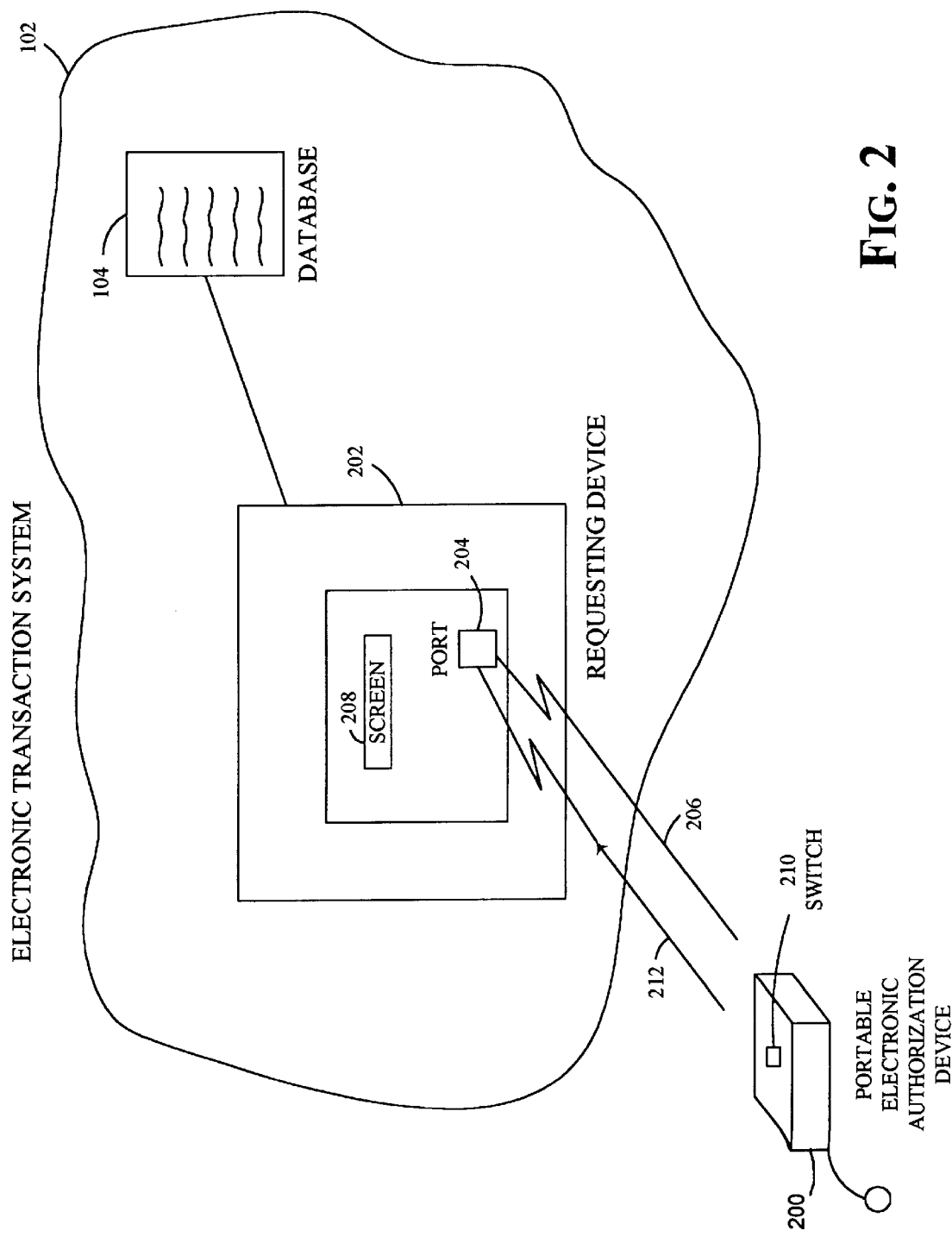
FIG. 2 illustrates, in accordance with one embodiment of the present invention, a portable electronic authorization device (PEAD), representing the apparatus for securely approving transactions conducted vis-à-vis an electronic transaction system.

FIG. 2 illustrates, in accordance with one embodiment of the present invention, a portable electronic authorization device (PEAD) 200, representing the apparatus for securely approving transactions conducted vis-à-vis an electronic transaction system. With reference to FIG. 2, requesting device 202 may initiate a transaction approval process with PEAD 200 by transmitting to PEAD 200, via communication port 204, a transaction request pertaining to a proposed transaction. Requesting device 202 may represent, for example, an ATM machine, a computer terminal in a network, an automated library check-out terminal, a portable device, hand-held device or similar devices for permitting the user to transact business with the electronic transaction system. The proposed transaction may be, for example, a sale transaction of a particular item for a certain amount of money. The transaction request itself may include, for example, the transaction ID, the merchant's name, the merchant's ID, the time of the proposed purchase, and the like. In one embodiment, the transaction request from requesting device 202 may be encrypted for enhanced security but this is not required. Data pertaining to the proposed transaction reaches PEAD 200 via path 206 in FIG. 2.

Port 204 may represent an infrared port to facilitate infrared communication with PEAD 200. Alternatively, port 204 may represent a wireless port for facilitating wireless communication. Port 204 may even represent a contact-type connection port, such as a magnetic read/write mechanism or a plug having electrical contacts for directly plugging PEAD 200 into port 204 to facilitate communication. Other techniques to facilitate communication between requesting device 202 and PEAD 200 are readily appreciable to those skilled.

The data pertaining to proposed transaction(s) may then be reviewed by the user, either on a screen 208 of requesting device 202 or optionally on a display screen provided with PEAD 200 (not shown in FIG. 2). If the user approves the transaction, e.g., a purchase of an item for a given amount of money, the user may then signify his approval by activating a switch 210 on PEAD 200, which causes an approval message to be created with the user's identification data, encrypted and transmitted back to requesting device 202 via path 212. If the transaction is not approved, the user may simply do nothing and let the transaction request times out after an elapsed time or may activate another switch on PEAD 200 (not shown in FIG. 1), which causes a reject message, either encrypted or non-encrypted, to be transmitted back to the requesting device 202 via path 212.

Figure 1:
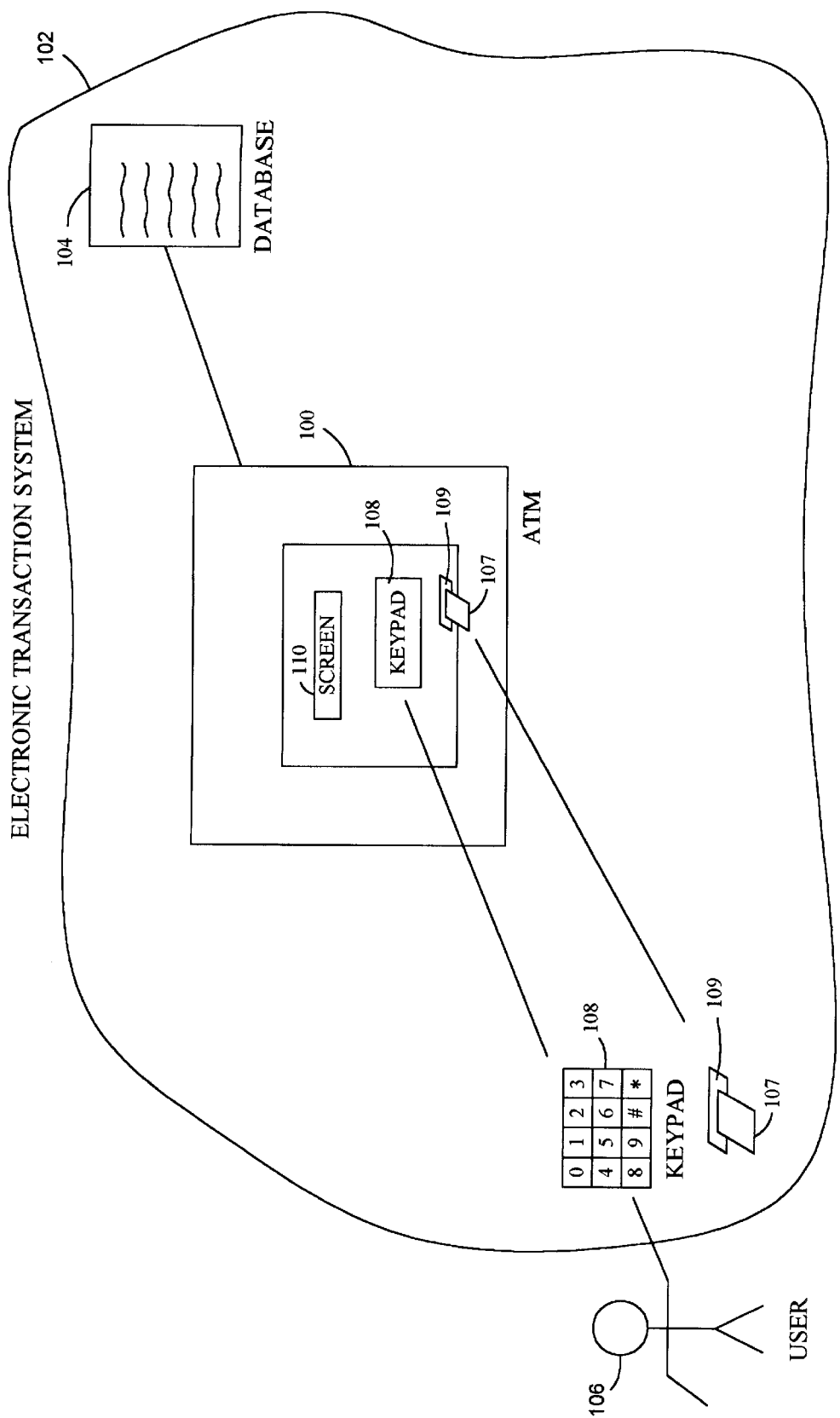
FIG. 1 shows a prior art electronic transaction system, including an automated teller machine (ATM).

The present invention is different from the prior art technique of FIG. 1 in that the user is required in the prior art to enter his identification data into the electronic transaction system, e.g., into ATM 100, to authenticate himself. In contrast, the present invention keeps the identification data related to the user secure within PEAD 200 at all times. Transaction approval occurs within PEAD 200, and the data representing such approval is encrypted, again within PEAD 200, prior to being transmitted to the electronic transaction system, e.g., to requesting device 202 in FIG. 2.

Accordingly, even if the approval data is intercepted, its encryption would prevent unauthorized users from employing the identification data for illicit purposes. If public key cryptography is employed to encrypt the approval data, the user's private key is also always kept within PEAD 200. Since the user's private key is required for encryption and is unknown to others, even to the electronic transaction system in one embodiment, the encrypted approval data, if intercepted, would be useless to unauthorized third parties even if the approval data can be deciphered using the user's public key. Again, this is different from prior art authentication techniques wherein encryption takes place within the electronic transaction system and requires the entry of the identification data and/or reading the user's private key from the ID card such as an ATM card, a credit card, and the like. As mentioned earlier, the fact that the prior art electronic transaction system requires this identification data and/or user's private key exposes these data to risks, e.g., if the requesting device is not secure or open to data interception via software or hardware.

As another difference, the present invention employs the circuitries within the portable electronic authorization device (PEAD) to perform the approval and encryption of the transaction approval data within the PEAD itself. In contrast, prior art data cards are essentially passive devices. For example, prior art ATM cards or credit cards only has a magnetic stripe for storing account information and do not have any facility to perform approval and/or encryption of the transaction approval data. While smart cards or IC cards, which are currently being developed, may contain electronic circuitries, current standards for their implementation still requires a reader associated with the requesting device to read out the identification data and/or user's private key in order for the requesting device to perform any approval and/or encryption. As mentioned earlier, the transmission of these data to the requesting device unnecessarily exposes these data to risks of theft and/or unauthorized interception once transmitted.

It should be borne in mind at this point that although public key cryptography is discussed throughout this disclosure to facilitate ease of understanding and to highlight a particular aspect of the invention, the overall invention is not limited to any particular cryptography algorithm and may be implemented using any conventional cryptography technique, including public key cryptography algorithms such as RSA, Diffie-Hellman, other discrete logarithm systems, elliptic curve systems, or the like. For additional information on some of the different public key cryptography techniques, reference may be made to, for example, the IEEE P1363 Working Draft dated Aug. 22, 1996, available from IEEE Standards Dept. 345 East $7^{th}$ Street, New York, N.Y. 10017-2349.

As mentioned, transaction approval in the prior art occurs within the electronic transaction system. In contrast, the present invention allows transaction approvals to occur within PEAD 200. The fact that transaction approvals occur entirely within PEAD 200 provides many advantages. By way of example, this feature eliminates the need to have, in one embodiment, the identification data and/or the user's private key in the requesting device. The fact that transaction approvals occur entirely within PEAD 200 (using the user identification data and/or the user's private encryption key that are always kept secure within PEAD 200) substantially enhances the confidentiality of the user identification data and the user's private key, as well as the integrity of the transaction approval process.

Since approval occurs entirely within PEAD 200, the user identification data that is employed to authenticate transactions may be more complicated and elaborate to ensure greater security. By way of example, the user identification data may be more elaborate than a simple password and may include any of the user's name, his birth date, his social security number, or other unique biometrics or unique identifying data such as fingerprint, DNA coding sequence, voice print, or the like. In contrast, prior art authentication techniques limit the user identification data to simple patterns, e.g., simple password of few characters, that are easily memorized by the user since more elaborate identification data may be too difficult to remember or too cumbersome to manually enter. Furthermore, even if the complicated ID data may be stored in the prior art data card, it is still required to be read into the requesting device of the electronic transaction system, again exposing this data to interception or theft once read.

Additional safeguards, which will be described in detail herein, may also be provided to prevent access, whether electronically or by physical means, to the user identification data and/or the user's private key within PEAD 200. Since the identification data and/or the user's private key are never exposed, security risks to the these data are substantially minimized.

Figure 3A:
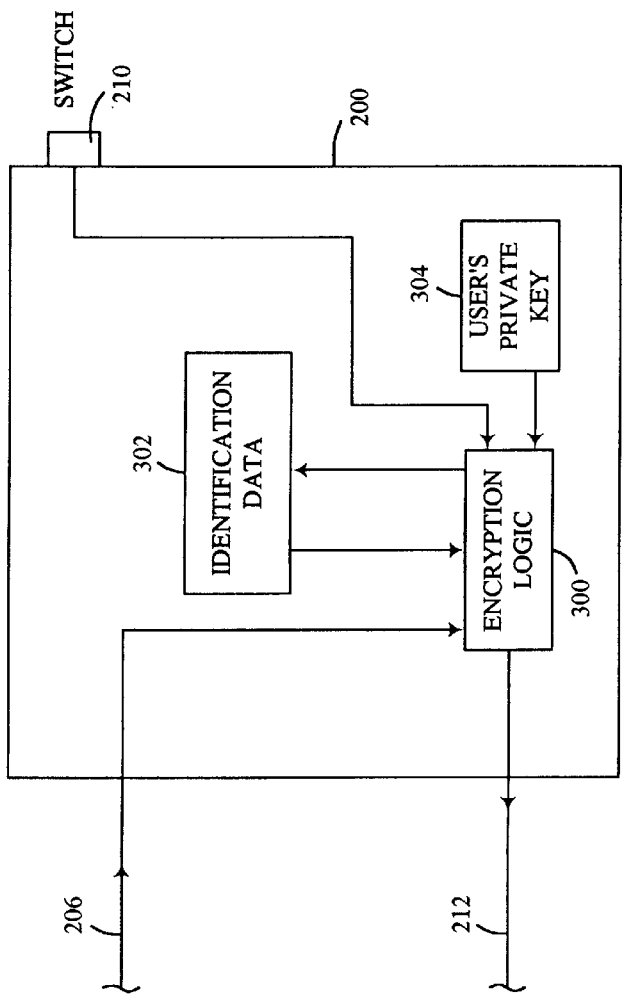
FIG. 3A shows, in one embodiment of the present invention, a simplified schematic of the PEAD of FIG. 2.

FIG. 3A shows, in one embodiment of the present invention, a simplified schematic of PEAD 200 of FIG. 2, including switch 210. Data path 206 is provided for receiving transaction requests from the electronic transaction system, and data path 212 is provided for transmitting transaction approval data back to the electronic transaction system. It should be borne in mind that although two data paths are discussed herein for ease of understanding, these data paths and other data paths herein may, in one embodiment, represent logical data paths and may be implemented via a single physical data connection. Likewise, the different ports herein may represent, in one embodiment, logical data ports for ease of understanding and may in fact be implemented using a single physical port.

When a transaction request, e.g., a withdrawal transaction from an ATM machine in the amount of $200.00, is transmitted via data path 206 to PEAD 200, this transaction is received by encryption logic 300. At this point, the user may review the proposed transaction, e.g., via the display screen or audio output provided with the electronic transaction system and/or PEAD 200, and has a choice to either approve or disapprove the proposed transaction. If the user approves the transaction, he may, in one embodiment, activate a switch 210, which causes the transaction approval data to be created and then encrypted by encryption logic 300 prior to being transmitted back to the electronic transaction system via path 212.

Note that the user identification data block 302, which is employed in the transaction approval process, is not directly coupled to paths 206 and 212. In other words, the memory portion storing the user identification data is intentionally decoupled from the input and output ports of PEAD 200 to prevent direct access thereto.

If access to user identification data 302 is desired, e.g., to approve a transaction, the access can only be made by encryption logic block 300. Likewise, it is not possible to directly access the memory portion 304, which stores the user's private key. If access to user's private key 304 is desired, e.g., to encrypt the transaction approval data, the access can only be made by encryption logic block 300. It should be borne in mind that although user identification 302 and user's private key 304 are shown stored in different memory portions, such illustration is made for ease of understanding and both of these may in fact be stored, in one embodiment, at different addresses on the same memory module.

Figure 3B:
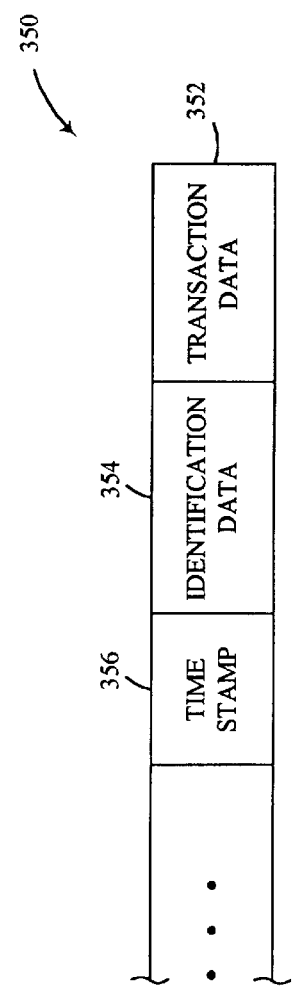
FIG. 3B shows, in one embodiment, the format of representative transaction approval data.

In some cases, the transaction approval data requires the inclusion of certain pieces of identification data 302. For example, a transaction embodied in the transaction request from the electronic transaction system may be appended with data representative of an "electronic signature" prior to being encrypted and retransmitted back to the electronic transaction system. FIG. 3B shows, in one embodiment, the format of representative transaction approval data 350. With reference to FIG. 3B, transaction data 352, representing a portion of or the entire transaction request received from the electronic transaction system, is appended with certain user identification data 354 and optionally a time stamp 356. The formation of transaction approval data 350 only occurs if the transaction request has already been approved by the user. Once appended, transaction approval data 350 is then encrypted prior to being retransmitted back to the electronic transaction system.

In some cases, it may be desirable to encrypt the transaction request prior to transmission to the PEAD to further enhance security. For example, certain transaction partners, e.g., vendors or other users on the computer network, may wish to keep the information within a transaction request confidential and may prefer to encrypt the transaction request before furnishing it to the PEAD. Data encryption is also desirable when, for example, the user identification data and the user's private key is written into a blank PEAD for the first time to configure a PEAD that is unique to a given user. The configuration data pertaining the user identification data and the user's private key, while must be written only once into PEAD 200 by the issuer of PEAD 200, is preferably encrypted to render them less vulnerable to theft. Issuers of PEAD 200 may represent, for example, credit card issuers, the government, or any other institution with whom the user maintains an account.

Figure 4:
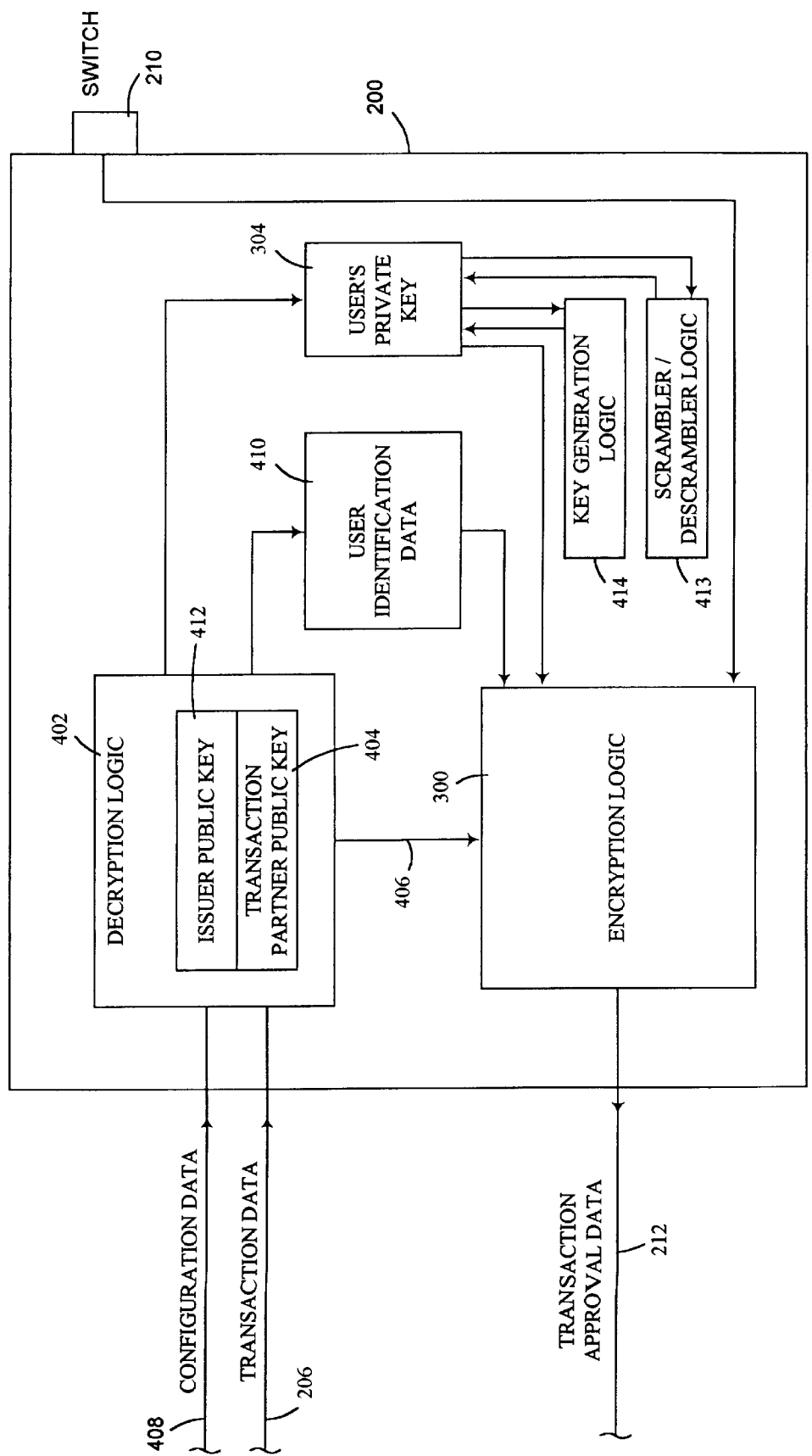
FIG. 4 illustrates, in accordance with one embodiment of the present invention, a logic block schematic of the PEAD.

FIG. 4 illustrates, in accordance with one embodiment of the present invention, a schematic of PEAD 200 of FIG. 2. The PEAD 200 of FIG. 4 further employs decryption logic for receiving the encrypted configuration data and optionally the encrypted transaction requests. In FIG. 4, encryption logic 300, user's private key 304, and data paths 206 and 212 are arranged and function substantially as discussed in connection with FIG. 3A.

Transaction requests are normally non-encrypted, i.e., they are received and processed in the manner discussed in connection with FIG. 3A. For highly sensitive transactions, however, the transaction requests may be encrypted and transmitted to PEAD 200 via data path 206 and input into decryption logic 402 to be decrypted. If a public key cryptography is employed, the encrypted transaction requests may be decrypted with a transaction partner public key 404.

Once decrypted, the transaction request is then displayed to the user for approval. The transaction approval data may be furnished to encryption logic 300 via path 406 to be encrypted if approved, e.g., responsive to the activation of switch 210. The encryption is preferably performed with the user's private key 304 if a public key cryptography technique is employed, and the encrypted transaction approval data is then transmitted back to the electronic transaction system via data path 212.

As configuration data typically includes sensitive user identification data and user's private key, it is often encrypted prior to being transmitted to PEAD 200 via data path 408. The encrypted configuration data is received by decryption logic 402 and decrypted therein prior to being written into user identification data block 410 and user's private key block 304. If public key cryptography is employed, the encrypted configuration data may be encrypted by the issuer's private key in the electronic transaction system prior to transmission and decrypted once received by PEAD 200 with an issuer public key 412.

Note that once the configuration data is decrypted and written into user identification data block 410 and user's private key block 304, the user identification data and user's private key can only be accessed subsequently by encryption logic 300. Also note that there is no direct connection from any of the I/O data paths, e.g., data path 206, 212, or 408, to user identification data block 410 as well to user's private key block 304. Advantageously, the sensitive user identification data and user's private key therein are not susceptible to access from outside once written into respective blocks 410 and 304 (which may, in one implementation, simply represent memory blocks in PEAD 200's memory).

Additionally, the user identification data and the user's private key cannot be updated by those not having the issuer's private key. As represented in FIG. 4, data can only be written into user's private key block 304 and user identification block 410 after it is decrypted via decryption logic 402 with issuer public key 412. Accordingly, unless the updated configuration data has been encrypted using the issuer's private key (which is presumably highly secure), the updated configuration data will not be decrypted and written into respective blocks 304 and 410. Of course if the configuration data within blocks 304 and 410 cannot be updated physically, e.g., they are stored using memory that can be written only once such as PROM (programmable read-only memory), WORM (write once, read many), or the like, the security consideration associated with unauthorized alteration of configuration data is substantially eliminated.

If a greater level of security is desired, the user's private key may be optionally be scrambled or randomized prior to being written into user's private key block 304 by optional scrambler/descrambler logic 413. Scrambler/descrambler logic 413 may, in one embodiment, receive the user's private key, which is furnished by the institution that issues PEAD 200 to the user, and scrambles and/or randomizes it to generate yet another user's private key and a corresponding user's public key. This scrambled/randomized user's private key is then stored in user's private key block 304, which is now unknown even to the issuer of PEAD 200, and the corresponding user's public key may be made known to the issuer and/or the transaction partners to facilitate transactions. Advantageously, there is no other copy of the scrambled/randomized user's private key anywhere else beside within user's private key block 304.

In an alternative embodiment, there may be employed an optional key generation logic 414 which, responsive to a request from the issuing institution, generates the user's private key and the user's public key on its own, i.e., without first requiring the receipt of a user's private key from the issuing institution and randomizing it. The generated user's private key is then stored in private key block 304 and the public key is made known to the issuing institution and/or the transaction partners to facilitate transactions. In this manner, no version of the user's private key, whether randomized or not, exists outside the PEAD itself. As can be appreciated by those skilled in the art, the use of key generation logic 414 further enhances the confidentiality of the user's private key.

Figure 5A:
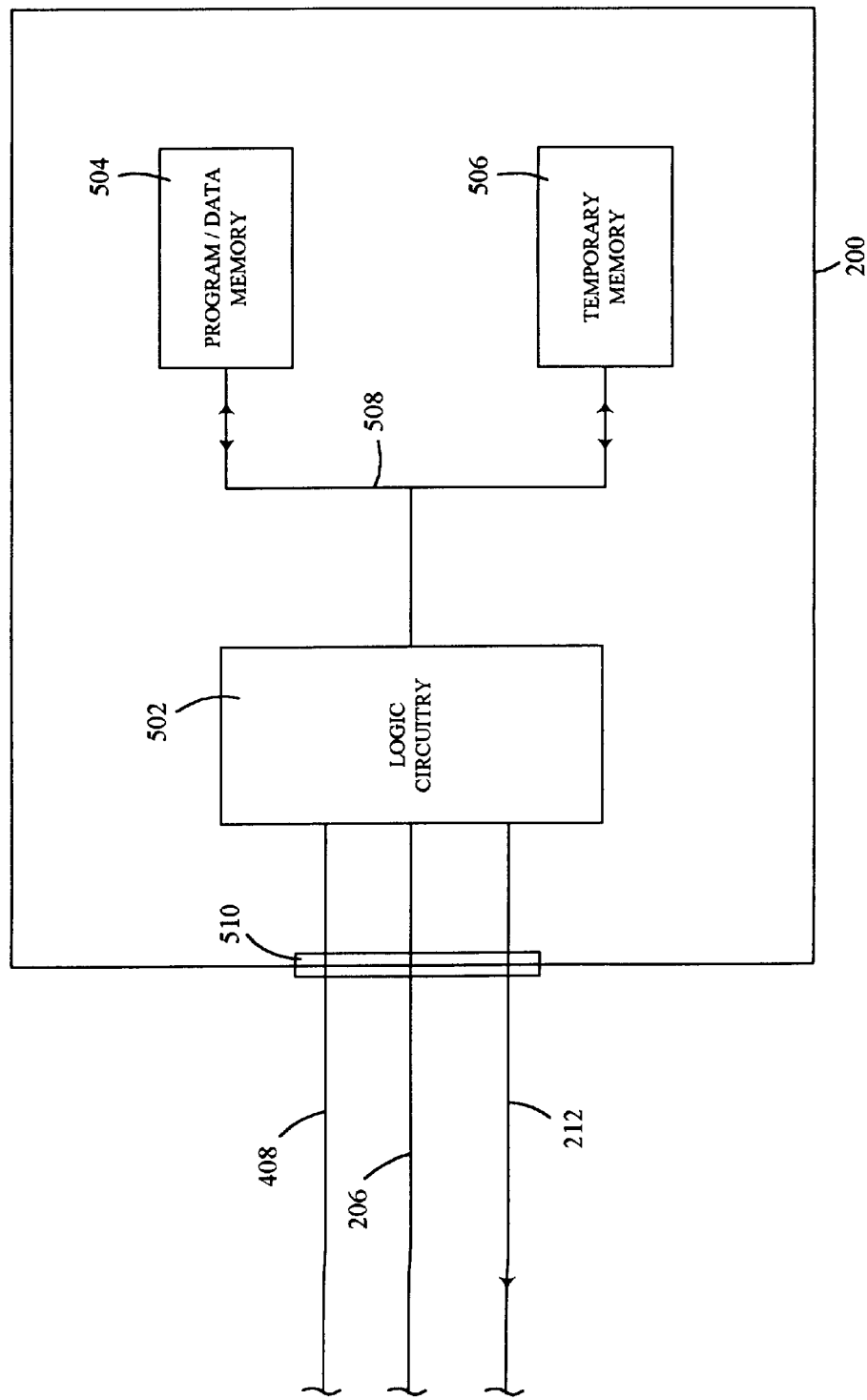
FIG. 5A represents, in accordance with one embodiment of the present invention, a high level hardware implementation of the PEAD.

FIG. 5A represents, in accordance with one embodiment of the present invention, a high level hardware implementation of PEAD 200. As shown in FIG. 5A, PEAD 200 includes logic circuitry 502, which may represent a central processing unit such as a microprocessor or a microcontroller, discrete logic, programmable logic, an application-specific integrated circuit (ASIC), or the like, for implementing encryption logic 300 of FIG. 2 and optionally decryption logic 402 of FIG. 4.

Program/data memory 504 stores, among others, the codes which operate PEAD 200 as well as the user identification data and the user's private key. Program/data memory 504 is preferably implemented using some form of non-volatile memory (NVM) such as flash memory, electrically programmable read-only memory (EPROM), electrically erasable, programmable read-only memory (EEPROM), or the like. Temporary memory 506 serves as a scratch pad for calculation purposes and for temporary storage of data, and may be implemented using some form of random access memory (RAM) such as static RAM or dynamic RAM, which are known in the art. Alternatively, either optical memory, magnetic memory, or other types of memory may be employed to implement program/data memory 504 and/or temporary memory 506.

A bus 508 couples program/data memory 504 and temporary memory 506 with logic circuitry 502. Communication port 510 represents the communication gateway between PEAD 200 and the electronic transaction system and may be implemented using infrared technology, wireless RF technology, a magnetic read/write head, a contact-type plug for facilitating serial or parallel data transmission, or the like. Communication port may also represent, in one embodiment, a PC card port (popularly known to those skilled as a PCMCIA card). Data path 206 inputs transaction requests into logic circuitry 502 while data path 212 outputs transaction approval data from logic circuitry 502 to the electronic transaction system. Optional data path 408, which has been described in FIG. 4, inputs configuration data into PEAD 200 to write the user identification data and the user's private key into program/data memory 504 to uniquely configure PEAD 200 to a particular user.

Again, note that access to program/data memory 504 and the data therein (e.g., the user identification data and the user's private key) can only be made by logic circuitry 502. For example, the user identification data and the user's private key can only be written into program/data memory 504 if this data has been properly encrypted with the issuer's private key. Access to these memory blocks for writing thereto may also be restricted by logic circuitry 502 under appropriate software and/or firmware control.

Similarly, reading the user identification data and accessing the user's private key can only be accomplished via the encryption logic of logic circuitry 502. The advantages to security of this aspect has been discussed in connection with FIGS. 3A and 4, the most important point being there is preferably no direct access to the sensitive user identification data and user's private key from the outside. Consequently, the confidentiality and security of these data items are greatly enhanced with the inventive design.

Some type of power source, such as a battery, may be provided as well. If PEAD 200 is implemented as a single-chip design, i.e., substantially all components shown in FIG. 5A are fabricated on a single die, then power is external to the die itself. If contact-type communication is employed, e.g., if PEAD 200 must be plugged into the electronic transaction system to conduct transactions, power external to the entire PEAD may be employed for transaction approvals when plugged in, thereby eliminating the size, weight, and cost penalties associated with having a battery onboard the portable transaction apparatus.

In one embodiment, PEAD 200 may be implemented using a general purpose portable computing device, such as any of the miniaturized portable computers, personal digital assistants (PDA's) or portable phones that are currently popular. A PDA such as the Apple Newton or 3COM's Palm VII, for example, may be employed to implement PEAD 200. Additionally, portable phones such as the Nokia 7110 Media Phone, Ericsson R280 SmartPhone or Motorola i1000 plus can be employed to implement the PEAD 200. In this case, it is understood that the portable device such as a PDA, Media Phone or SmartPhone can be a requesting device itself, which communicates a remote electronic transaction system through a wireless network. The PEAD functionality can be embedded into such a portable requesting device.

Figure 5B:
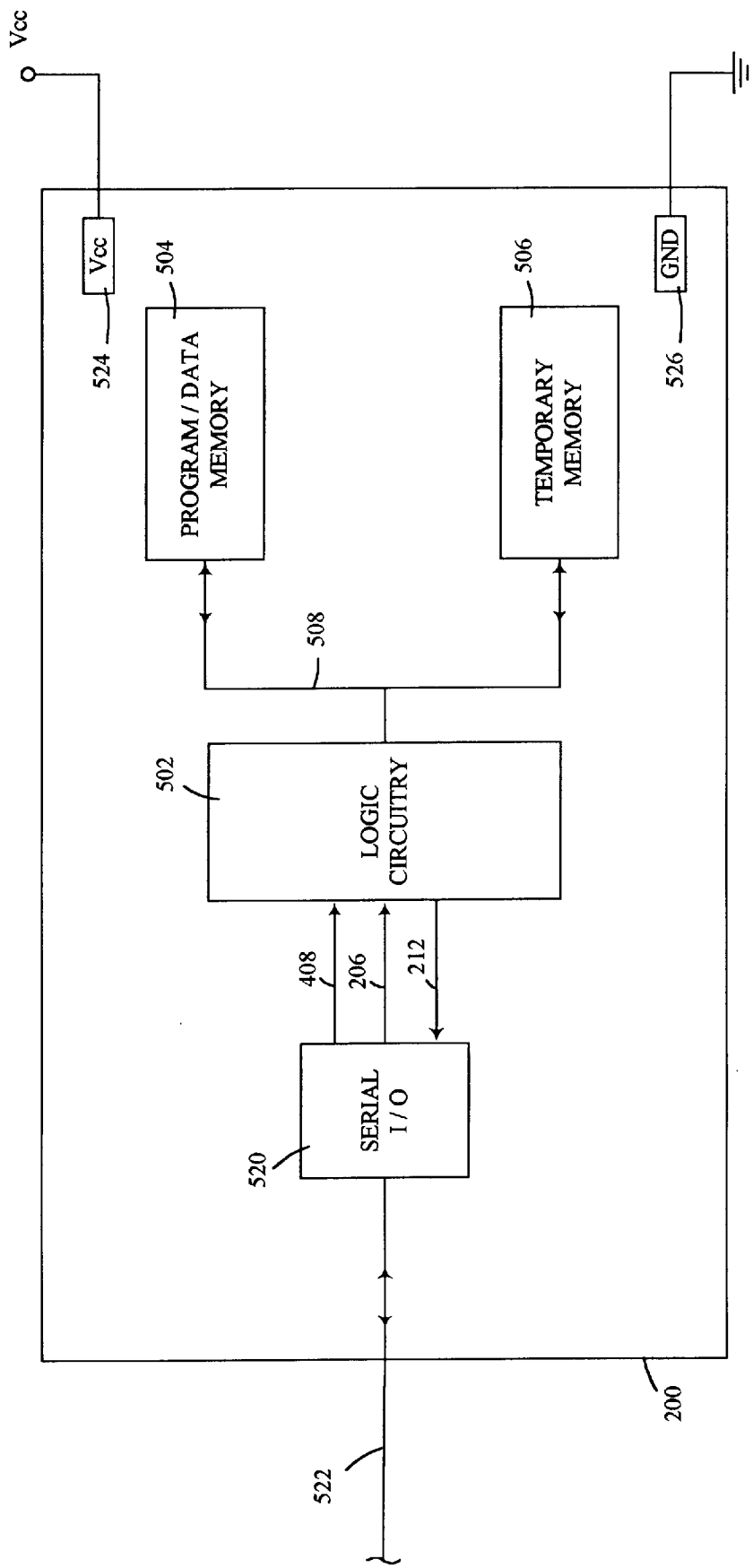
FIG. 5B illustrates one implementation of a PEAD wherein the PEAD circuitries are implemented on an IC.

FIG. 5B illustrates one implementation of a PEAD wherein the circuitries are implemented on an IC. In FIG. 5B, components having like reference numbers to components in FIG. 5A have similar functions. Data paths 408, 206, and 212, which have been described in connection with FIG. 5A, is coupled to a serial I/O circuit 520, which facilitates data transmission and receipt in a serial manner on data path 522 between PEAD 200 and the electronic transaction system. Vcc pin 524 and ground pin 526, which provide power to PEAD 200 of FIG. 5B, are also shown.

Figure 5C:
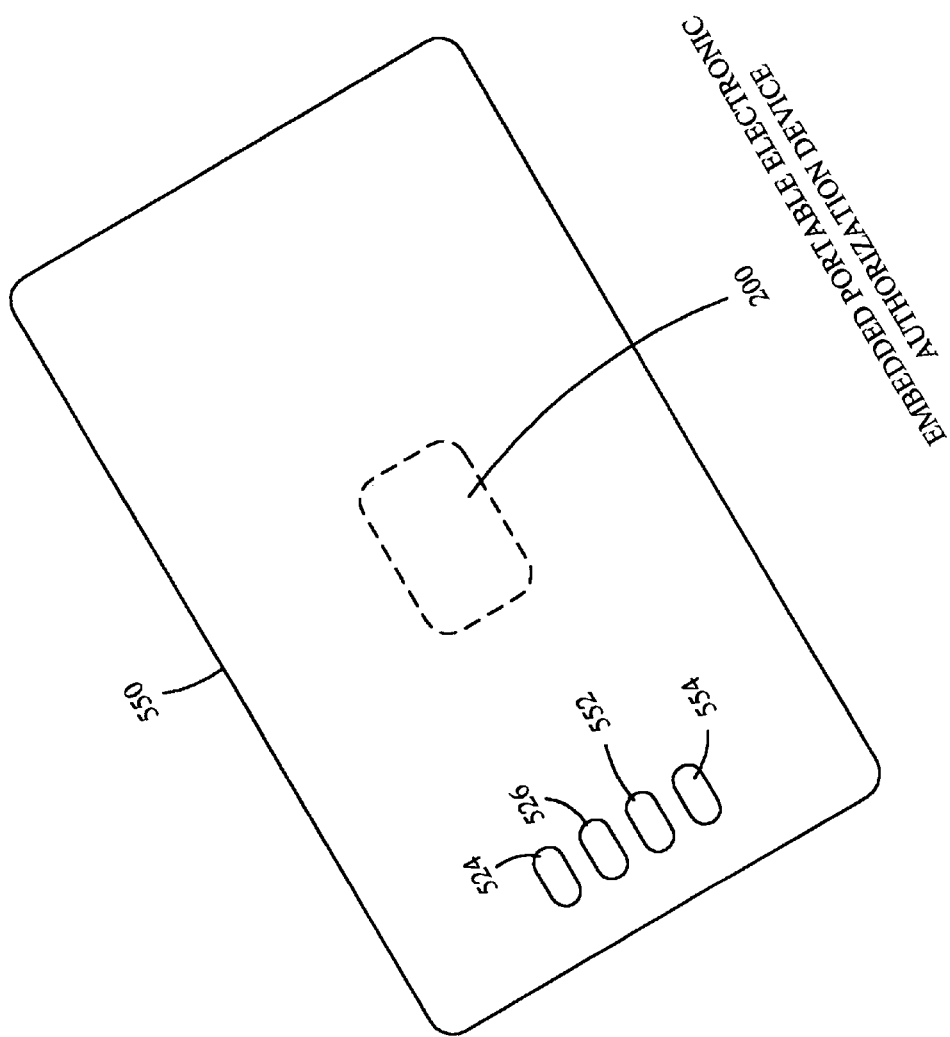
FIG. 5C represents an external view of the PEAD of FIG. 5B after being embedded in a card-like package.

FIG. 5C represents an external view of the PEAD of FIG. 5B after being embedded in a card-like package for ease of carrying and insertion into a serial I/O port of the electronic transaction system. Card 550, which embeds the integrated circuit implementing the inventive PEAD, includes, in one embodiment, four external contacts. External serial contacts 552 and 554 carry data and ground respectively to facilitate serial communication with a serial device of an electronic transaction system. External Vcc contact 524 and external ground contact 526, which supply power to the PEAD as discussed in connection with FIG. 5A, are also shown. When card 550 is inserted into an electronic transaction system, it is powered through external contacts 524 and 526, thereby enabling the PEAD circuitries therein to receive transaction requests via external serial contacts 552 and 554, approve the requests within the PEAD if appropriate, encrypt transaction approval data within the PEAD circuitries, and serially communicate the encrypted transaction approval data to the electronic transaction system via external serial contacts 552 and 554.

Figure 6A:
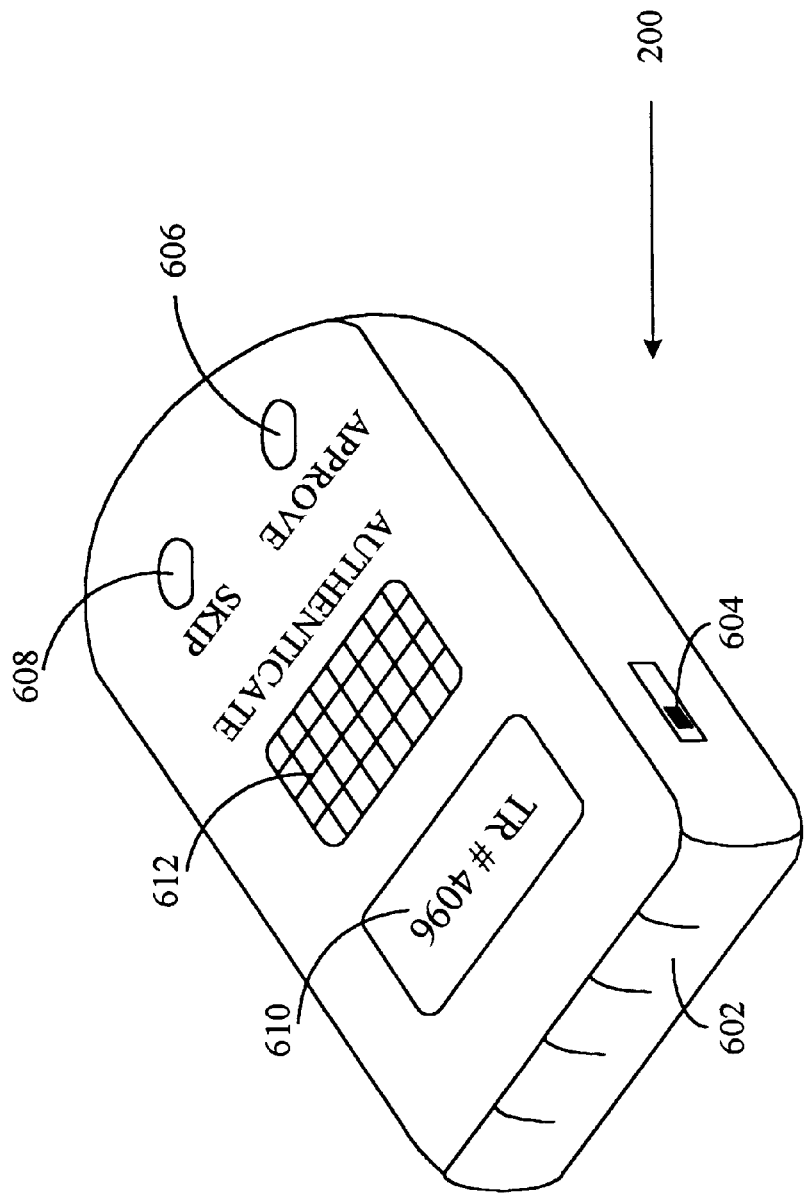
FIG. 6A illustrates an external view of the PEAD in accordance with a preferred embodiment of the present invention.

FIG. 6A represents an external view of a PEAD in accordance with a preferred embodiment of the present invention. PEAD 200 of FIG. 6A is preferably implemented as a small, self-containing package that is sufficiently ruggedized for daily use in the field. Preferably, PEAD 200 of FIG. 6A is small enough to be comfortably carried with the user at all times, e.g., as a key chain attachment or a small package that can easily fit inside a purse or a wallet. The physical enclosure of PEAD 200 is preferably arranged such that the content will be tamper-proof (i.e., if it is opened in an unauthorized manner then the user's private key and/or the user identification data will be destroyed or the PEAD will no longer be able to approve transactions). By way of example, the enclosure may be arranged such that if it is opened, there is a change in the flow of current in a current path, e.g., either the existing current flow is interrupted or a current path that has been idle starts to flow. The change in the flow of current may then force RESET the circuitry, including erasing the private key in the memory.

There is shown an infrared communication port 602 for receiving and transmitting data vis-à-vis the electronic transaction system. A small on/off switch 604 permits the user to turn off the PEAD to conserve power when not in use. Approve button 606 permits the user to signify approval of a proposed transaction. Optional skip button 608 permits the user to indicate rejection of a particular transaction. Skip button 608 may be omitted since a transaction request may be understood, in some embodiment, as not being approved if approve button 606 is not activated within a given period of time after receiving the request.

Optional display 610 may be implemented using any type of display technology such as liquid crystal technology. Displays 610 displays, among others, the transaction being proposed for approval. Display 610 may be omitted if desired, in which case the transaction may be viewed, for example, at a display associated with the electronic transaction system itself or by audio output on the PEAD. Optional user authentication mechanism 612 prevents PEAD 200 from being used for approving transactions unless the user is able to identify himself to PEAD 200 as the rightful and authorized user. Optional user authentication mechanism 612 may require the user to enter a password, to finish a fingerprint or a voice print, or other biometrics and/or identifying characteristics specific to the authorized user before PEAD 200 can be activated and employed for approving transactions. The PEAD 200 can be built-in a portable phone such that port 602 can be a wireless communication and/or infrared port, display 610 can be a display on the portable phone, and buttons 606 and 608 are button keys on the portable phone key pad.

For example, user authentication mechanism 612 can be a Fingerchip FC 15A140, a thermal silicon fingerprint sensor from Thomson-CSF of Totowa, N.J. Since no optics or light sources are needed as the finger's own heat produces all that is necessary to image the finger print, this implementation can be quite compact. In this embodiment, the user can authenticate himself/herself and approve a transaction through PEAD by simply presenting or sweeping his/her finger to/across the sensor 606, thereby rendering approve button 606 optional. As another example, the mechanism 612 can be a FPS110, a capacitive silicon finger print sensor from Veridicom of Santa Clara, Calif.

Figure 6B:
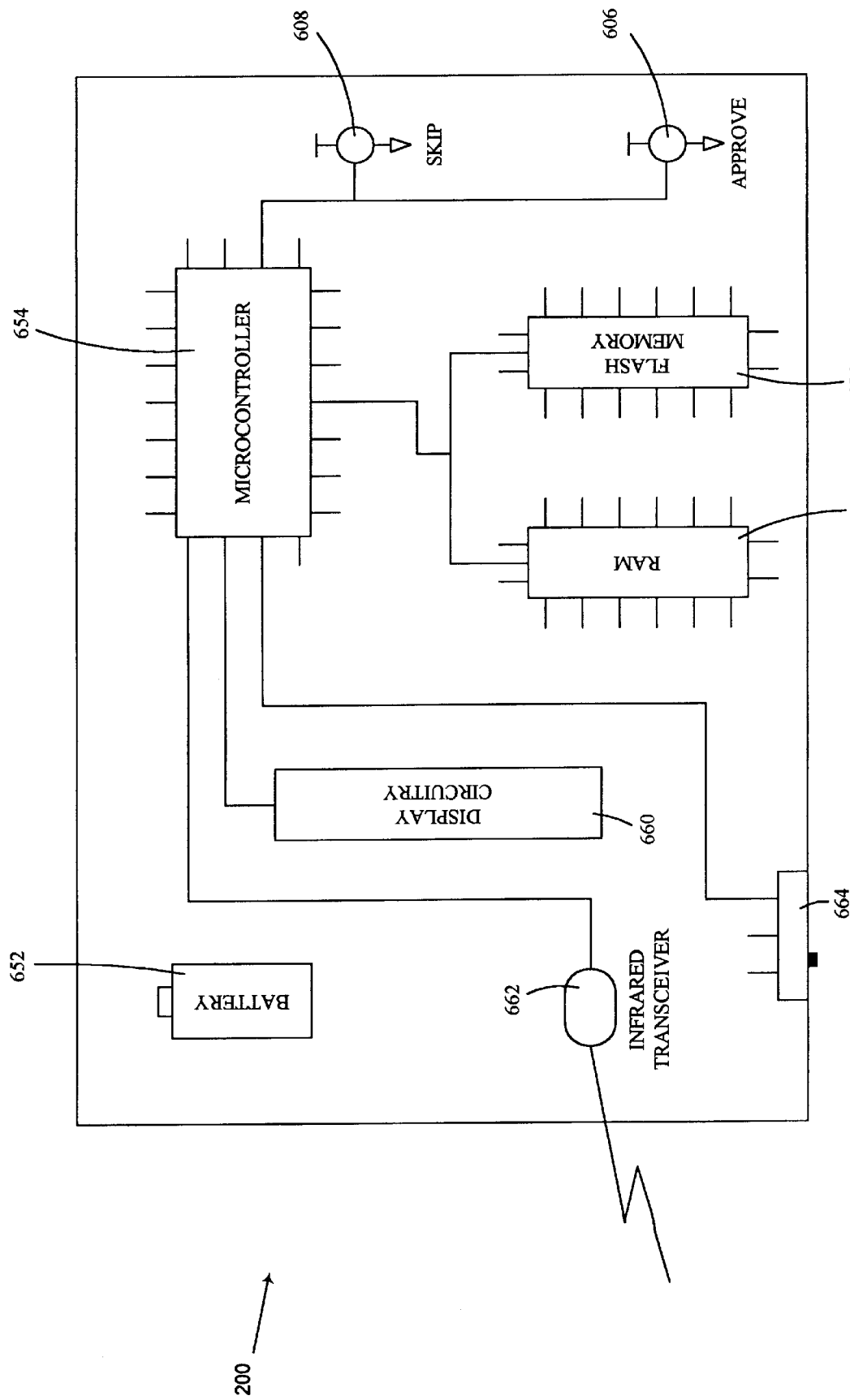
FIG. 6B illustrates, in a simplified manner and in accordance with one aspect of the present invention, the hardware for implementing the PEAD of FIG. 6A FIGS. 7A–B are flowcharts illustrating, in accordance with aspects of the present invention, the approval technique employing the inventive PEAD.

FIG. 6B illustrates, in a simplified manner and in accordance with one aspect of the present invention, the hardware for implementing PEAD 200 of FIG. 6A. Battery 652 provides power to the circuitry of PEAD 200. A microcontroller 654 executes codes stored in flash memory 656 and employs random access memory 658 for the execution. In one embodiment, microcontroller 654, flash memory 656, and even random access memory 658 may be implemented on a single chip, e.g., a NC68HC05SCXX family chip from Motorola Inc. of Schaumburg, Ill. such as the NC68HC05SC28, or security controller of SLE 22, 44 and 66 family from Infineon Technologies of San Jose, Calif. such as SLE66CX320S. Approve button 606 and optional skip button 608 are coupled to microcontroller 654 to permit the user to indicate approval or rejection of a particular transaction displayed using display circuitry 660. Communication to and from the electronic transaction system is accomplished under control of microcontroller 654 via an infrared transceiver 662. Power switch 664 permits the user to power off PEAD 200 when not in use to conserve power and to prevent accidental approval.

Figure 7A:
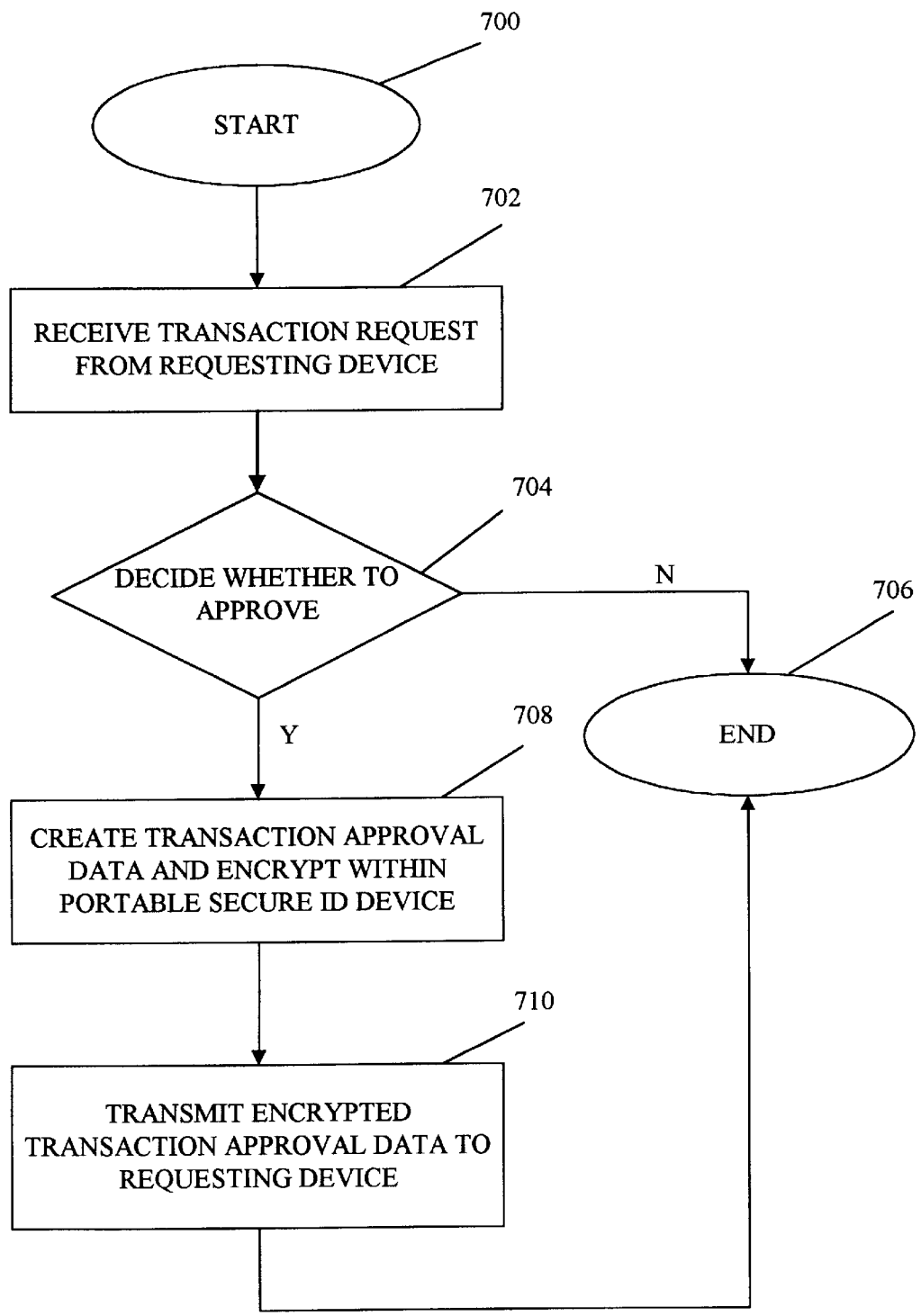

FIG. 7A is a flowchart illustrating, in accordance with one aspect of the present invention, the approval technique employing the inventive PEAD. In step 702, a transaction request is received at the PEAD from the requesting device associated with the electronic transaction system. In step 704, the user has the option whether to approve or disapprove the transaction proposed. If not approved, e.g., either by activating the skip button of the PEAD or simply allowing the request to time out, nothing will be done.

On the other hand, if the user approves the proposed transaction, the user may activate the approve button to create transaction approval data. The transaction approval data is then encrypted in step 708 within the PEAD. In step 710, the encrypted transaction approval data is transmitted to the requesting device of the electronic transaction system after being encrypted.

Figure 7B:
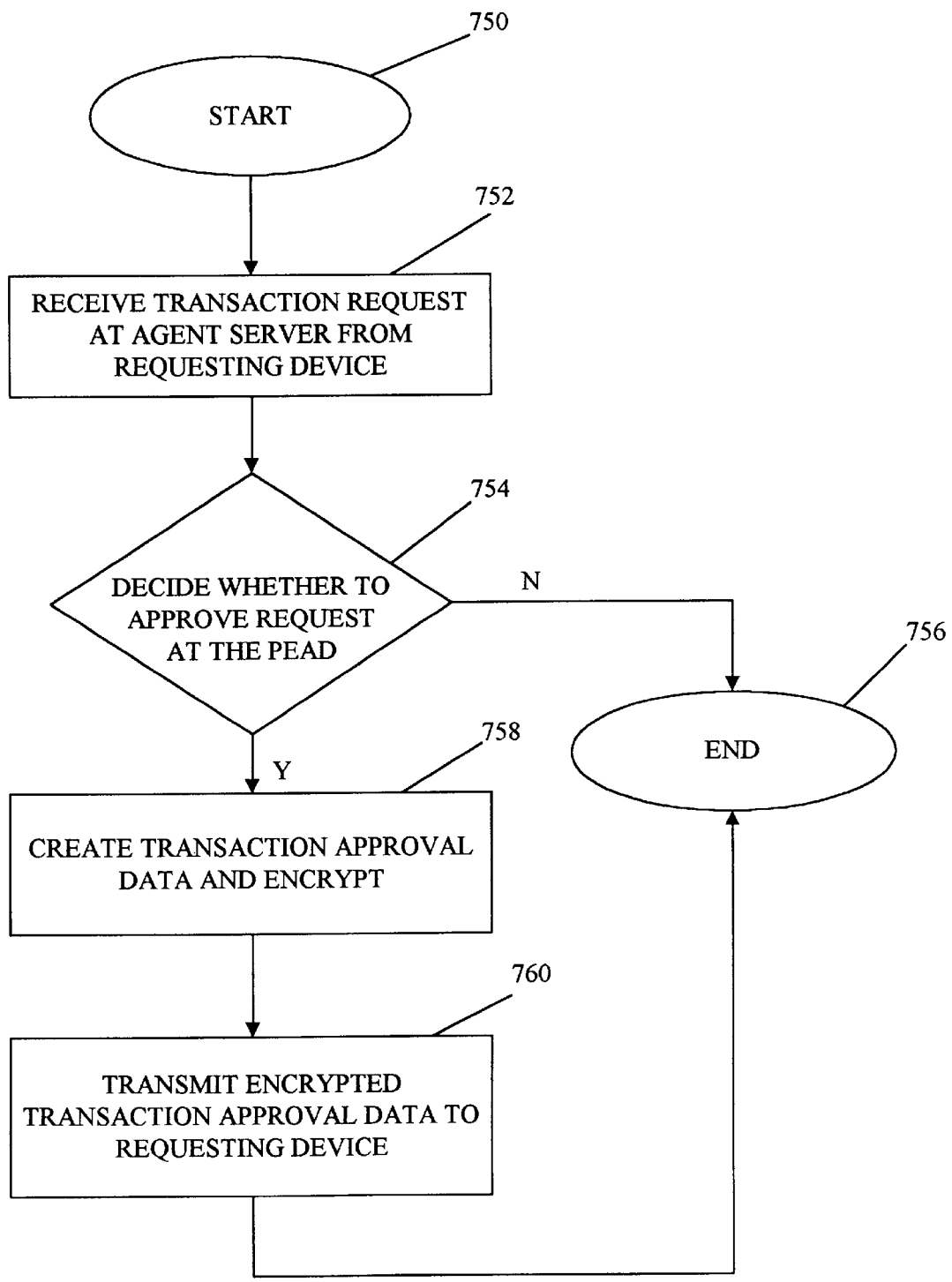

FIG. 7B is a flowchart illustrating, in accordance with another aspect of the present invention, the approval technique employing the inventive PEAD. In step 752, a transaction request is received at the agent server from the requesting device associated with the electronic transaction system. In step 754, the user has the option whether to approve or disapprove the transaction proposed at the PEAD. If not approved, e.g., either by activating the skip button of the PEAD or simply allowing the request to time out, nothing will be done.

On the other hand, if the user approves the proposed transaction, the user may activate the approve button to create transaction approval data. The transaction approval data is then encrypted in step 758, which can occur either within the PEAD or the agent server or both. In step 760, the encrypted transaction approval data is transmitted to the requesting device of the electronic transaction system after being encrypted.

Figure 8:
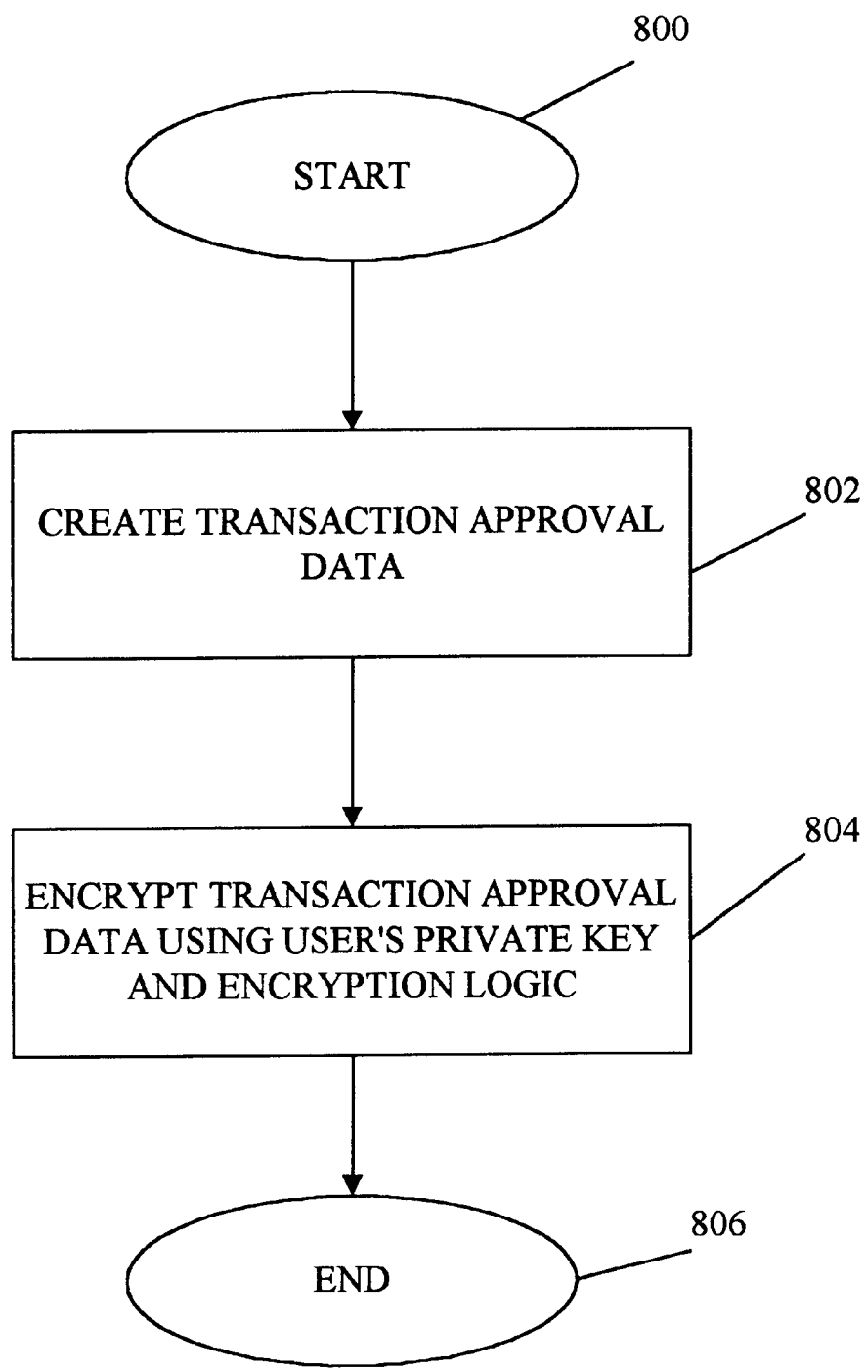
FIG. 8 is a flowchart illustrating, in accordance with one aspect of the present invention, steps involved in encrypting transaction approval data using a public key cryptography technique.

FIG. 8 is a flowchart illustrating, in accordance with one aspect of the present invention, the steps involved in encrypting transaction approval data using public key cryptography. In step 802, the transaction approval data package is created. As discussed earlier in connection with FIG. 3B, the transaction approval data may be created by appending any necessary user identification data to a portion of or the entire transaction request. Optionally, a time stamp may also be appended thereto. In step 804, the transaction approval data is encrypted using the user's private key, which is preferably kept secured at all times within the PEAD. Thereafter, the encrypted transaction approval data is transmitted back to the electronic transaction system.

In accordance with one aspect of the present invention, it is recognized that even if the encrypted transaction approval data is intercepted and decrypted for analysis by a third party, it is not possible to bypass the security features of the invention as long as the user's private key or the user identification data is secure. As mentioned earlier, since the user identification data is not accessible externally, it is always secure within the PEAD. This is unlike the prior art wherein the user is required to enter the identification data, e.g., password, at the electronic transaction system and risks exposure of this sensitive data.

Even if the user identification data is compromised, transaction approval still cannot take place unless there is possession of the user's private key. It would be useless to intercept the encrypted transaction approval data even if one can decrypt it using the user's public key since the transaction partner, e.g., the merchant requesting approval of the transaction, will not accept any transaction approval data not encrypted using the user's private key. Again, since the private key is not accessible externally, it is always secure within the PEAD. This aspect of the invention has great advantages in performing on-line transactions since the user's private key no longer has to be stored in a vulnerable computer file in a workstation, which may be accessible by other parties and may be difficult to conveniently tote along for other authentication tasks.

The fact that the PEAD is implemented in a small, portable package makes it convenient and comfortable for the user to maintain the PEAD within his possession at all times. Even if the PEAD is physically stolen, however, the optional user authentication mechanism, e.g., user authentication mechanism 612 of FIG. 6A, provides an additional level of protection and renders the PEAD useless to all but the properly authenticated user. Of course the user can always notify the issuer of the PEAD if the PEAD is stolen or lost, and the issuer can inform transaction partners to refuse any transaction approval data encrypted with the user's private key of the stolen PEAD.

The fact that the transaction approval data includes the time stamp, the merchant's name, the amount approved, and other relevant data also enhances the integrity of the transaction approval process. If the merchant inadvertently or intentionally submits multiple transaction approvals to the issuer, the issuer may be able to recognize from these data items that the submissions are duplicates and ignore any duplicate transaction approval data. For example, the issuer may recognize that is it unlikely for a user to purchase multiple identical dinners at the same restaurant at a given time and date.

It should be noted that while the discussion above has focused on transaction approvals, it should be apparent to those skilled that the PEAD may be employed to conduct any kind of transaction vis-à-vis an electronic transaction system any time secured data transmission from the user to the electronic transaction system is preferred. For example, the PEAD may be employed for logging into highly sensitive computer systems or facilities. When so implemented, the computer terminal with which the PEAD communicates may be equipped with an infrared port, a magnetic reader port, or a contact-type plug for communication with the PEAD. The user may then employ the PEAD to perform any type of authentication tasks online.

As a further example, the PEAD may be employed to "sign" any computer file for authentication purposes (e.g., to authenticate the date or the user). The transaction approval data may then be saved along with the file to be authenticated for future reference. Note that the transaction authentication data is again tamper-proof since any transaction authentication data not encrypted using the user's private key will not be accepted as authentic. Also, it should be apparent that if the PEAD is employed to approve only predefined transactions, the transaction data may be stored in advance within the PEAD and do not need to be received from externally by the PEAD.

In another embodiment, the invention relates to techniques for conducting electronic transactions within an electronic transaction system such that confidentiality, authentication, integrity, and non-repudiation are substantially assured. It is observed that successful electronic transactions (e.g., those conducted over a computer network such as the internet) have four major requirements: confidentiality, authentication, integrity, and non-repudiation. In the prior art, confidentiality is typically addressed by employing encryption to encrypt data between the user's computer and the remote server. One such encryption technique employed by NetScape Corp. of Mountain View, Calif. involves the use of a Secure Socket Layer (SSL), which essentially utilizes encryption (e.g., public key encryption) for the point-to-point communication over an open network.

Although encryption techniques like SSL can, to a certain degree, ensure that the transmission of a transaction is secure, there is however no mechanism to authenticate the identity of the person who actually conducted the transaction (i.e., there is an authentication deficiency). By way of example, if an unauthorized person, after cracking a legitimate user's password, employs that legitimate user's computer (which may be SSL-enabled) to conduct a transaction to the detriment of the legitimate user, there is no mechanism to determine during or after the transaction is completed whether the person conducting the transaction in question is an unauthorized person or the legitimate user. Even if the legitimate user himself conducted the transaction, the authentication deficiency renders it impossible to guarantee non-repudiation, as it is difficult for the vendor to prove that it is indeed the legitimate user who conducted the transaction in question. Furthermore, although the transmission is relatively secure using a secured transmission facility such as SSL, the transmitted data (such as terms in a contract or purchase order) may be susceptible to being modified after it is decrypted by personnel at the receiving end.

In accordance with one aspect of the present invention, there is provided a software-implemented technique for performing electronic transactions in a manner such that the aforementioned requirements may be better addressed. In one embodiment, the electronic transaction technique proposed herein employs a transaction program (TP), which is essentially a program or an applet that may be downloaded into the requesting device (e.g., device 202) from a server and executed at the requesting device to carry out the electronic transaction. By way of example, computer languages such as Java by Sun Microsystems Inc. of Mountain View, Calif. or ActiveX by Microsoft Corp. of Redmond, Wash. or HDML (Handheld Device Markup Language) by Unwired Planet, Inc. of Redwood City, Calif., may be employed although the electronic transaction technique proposed herein may be implemented by any other suitable computer language as well.

Once downloaded, the TP may be configured in any suitable manner for execution, preferably either as a stand-alone program or as a plug-in into one of the internet browsers (e.g., NetScape, Internet Explorer or Micro-browser by the aforementioned Netscape Corp., Microsoft Corp. and Phone.com, Inc. respectively).

Figure 9A:
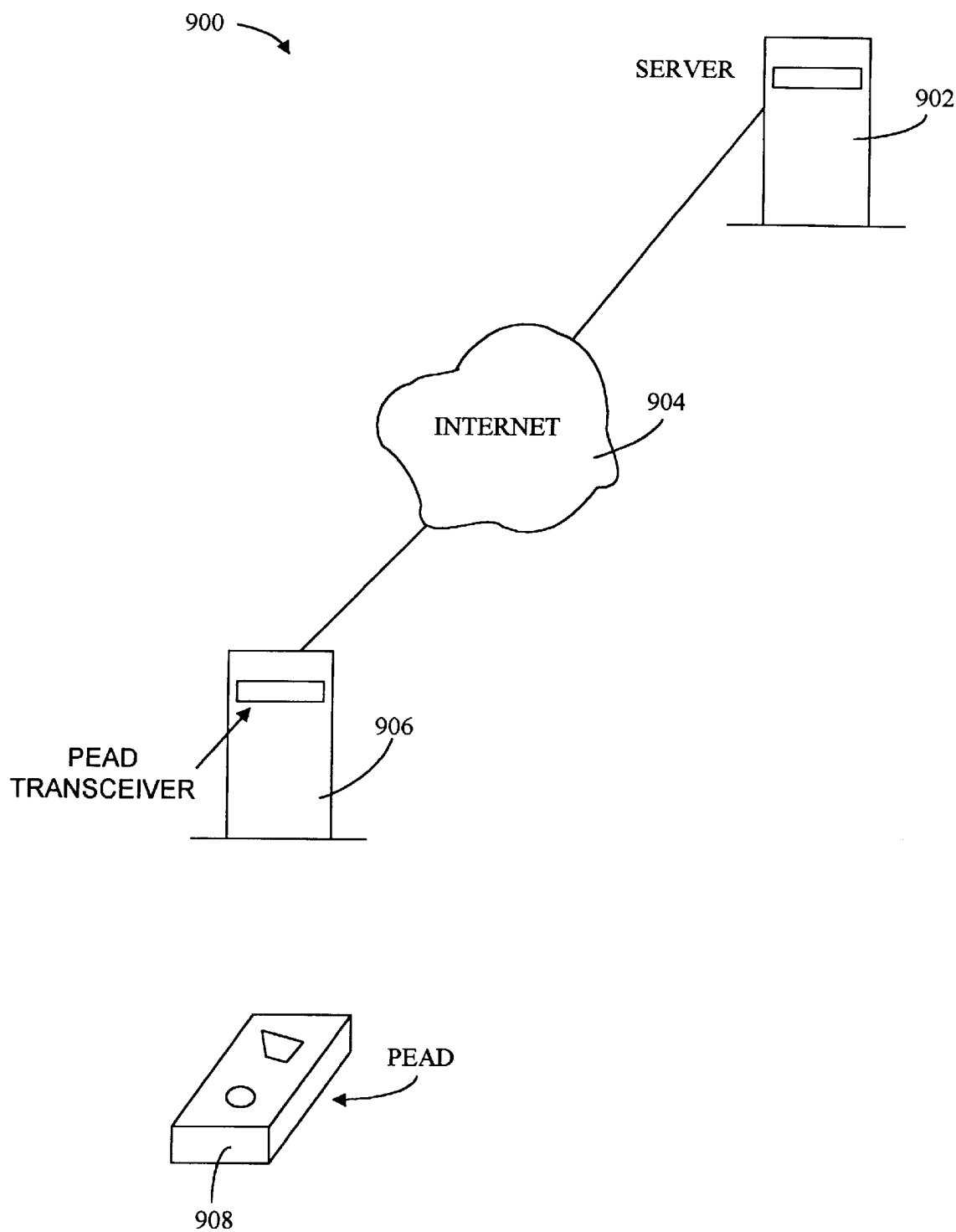
FIGS. 9A–B illustrate exemplary electronic transaction systems, including a transaction approval device, to facilitate discussion other aspects of the invention whereas a transaction program is employed to complete the electronic transaction.
Figure 9B:
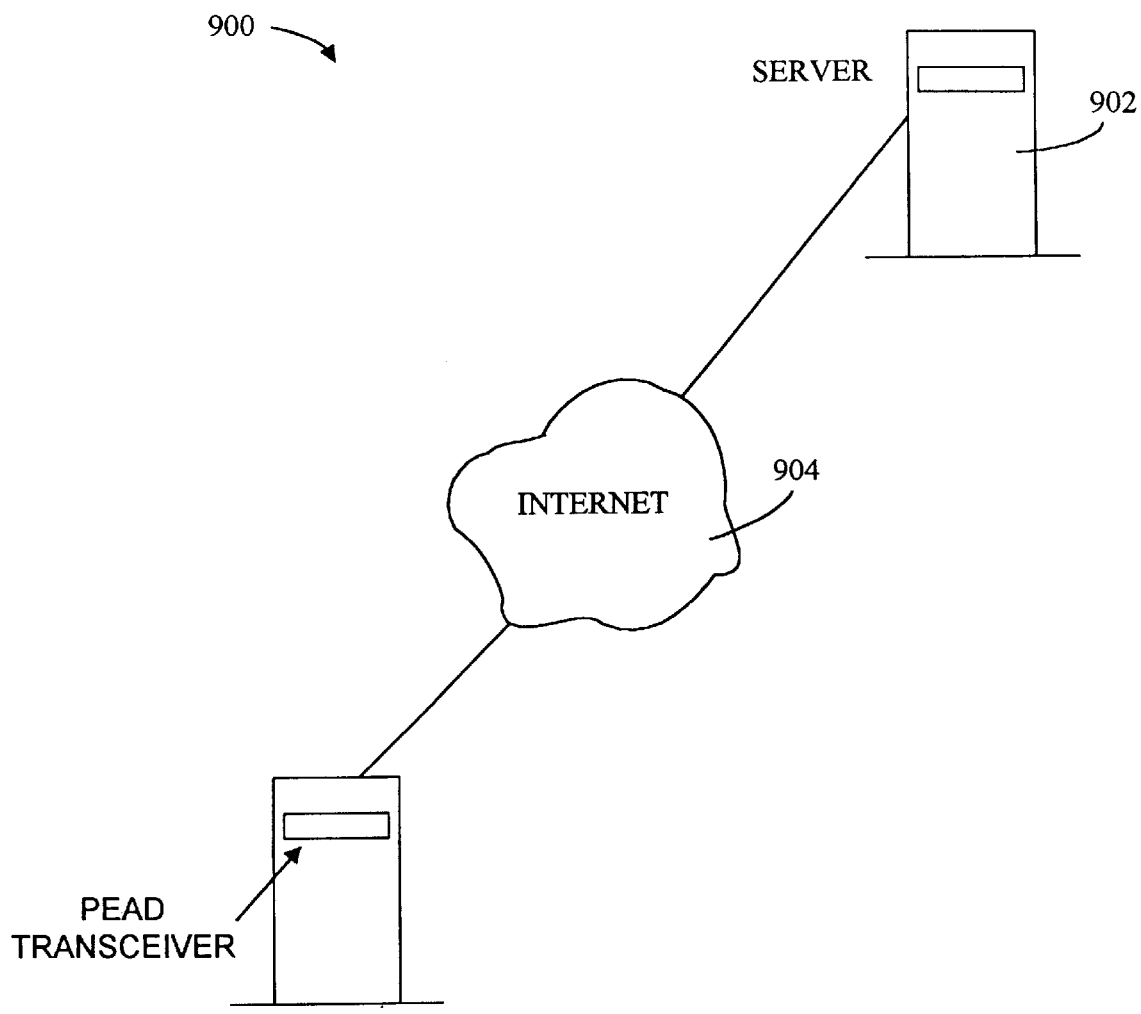
Figure 9B:
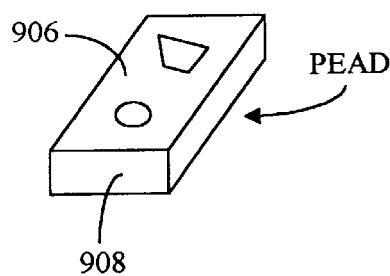

To facilitate discussion of the advantages and features of this aspect of the present invention, FIG. 9A depicts an electronic transaction network 900 including server 902, network 904, and requesting device 906. A transaction approval device, such as a PEAD 908 is also shown. Requesting device 906, as mentioned earlier, may represent any device for permitting the user to transact business with the electronic transaction system. Preferably, the requesting device is implemented by a suitable computer terminal that is capable of communicating with server 902 through network 904, which may represent a LAN, WAN, or the Internet. The computer terminal itself may be, for example, a desktop device, a portable device, a hand held device, or otherwise, including those implementing the Windows, Macintosh, Unix platforms or those capable of supporting a browser program. If the requesting device is a portable device, or hand-held device, then the PEAD 908 can be embedded into the requesting device 906. Also, the communication link between the requesting device 906 and the server 902 can be a wireless communication link as shown in FIG. 9B.

Figure 10:
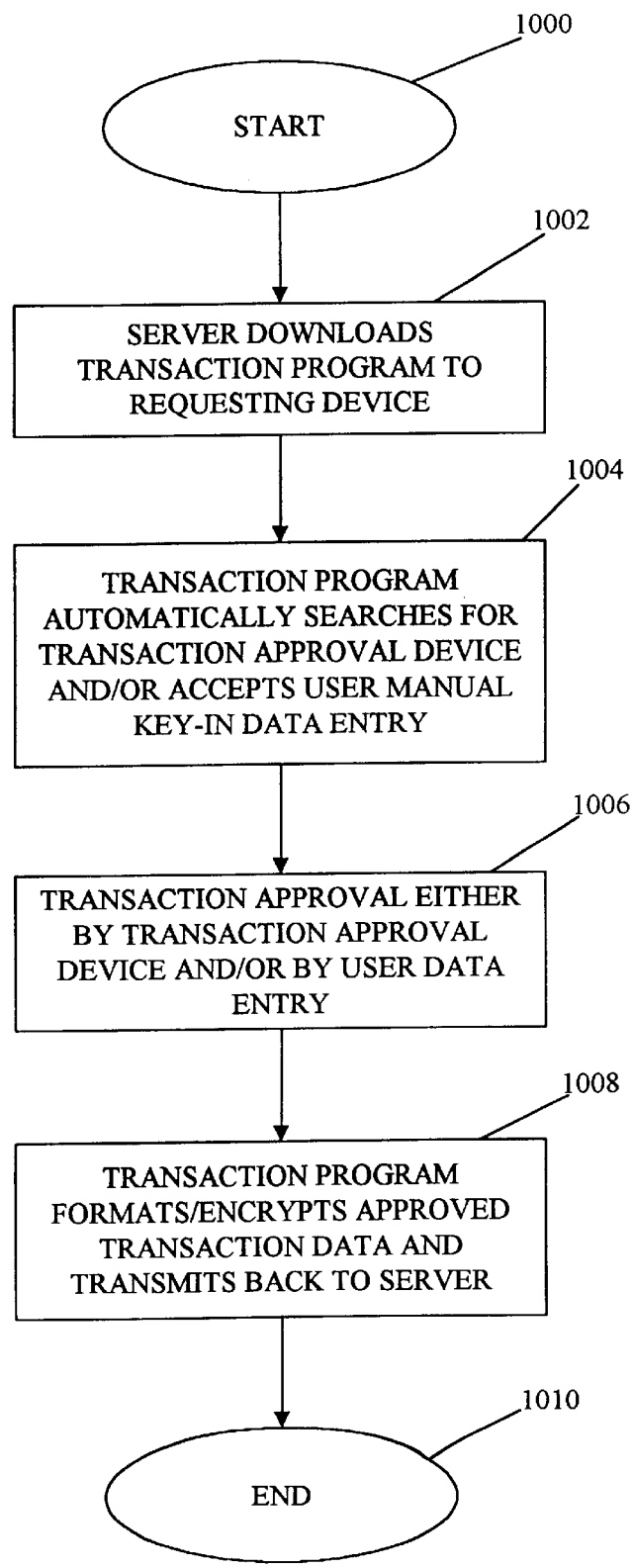
FIG. 10 illustrates an exemplary flowchart of a computer implemented process which, in accordance with one embodiment of the present invention, permits a downloaded transaction program to complete an electronic transaction at the requesting device.

To carry out an electronic transaction in accordance with one embodiment of this invention, the transaction program (TP) is preferably downloaded from the vendor's or service provider's server 902 into requesting device 906 (step 1002 of FIG. 10). The TP may include an executable portion as well as data related to the transactions for the user's input, approval, and/or authentication.

By way of example, if the transaction involves the purchase of an appliance, the TP may download data pertaining to the model, price, and the like. FIG. 11 depicts one exemplary transaction request for the purchase of appliances. As another example, if the transaction involves the purchase or sale of securities (such as stocks or bonds), the TP may be downloaded with data pertaining to the securities to be transacted. Of course, the transaction request may be relate to any type of transaction, including those that do not involve the exchange of cash or credit for goods or services (such as document transfer).

In return, the TP preferably receives user's data from the user (e.g., the user's identification data, any data which may be required for the proposed transaction such as the address information, quantity information, size information, method of payment, credit card number, account number, and the like), and an indication of approval of the transaction.

It should be appreciated that the specific data to be downloaded may vary depending on the nature of the transaction to be performed. Likewise, the data to be received by the TP from the user may vary with applications. In some cases, if the user has already supplied the vendor with some of the requested data in the past (such as the user's address), the TP may not ask for the same data again or may simply present the already supplied data to the user for validation and/or possible editing.

The executable portion of the TP preferably includes codes to automatically detect the presence of a transaction approval device (such as the aforementioned PEAD, a smart card device, a Credit Card Reader, or the like) so that the TP can employ the transaction approval device to complete the transaction (step 1004 of FIG. 10). By way of example, the downloaded code may be configured to search the user's computer to detect whether a transaction approval device has been installed or to use the user's computer communication port(s) to query for the existence of a transaction approval device that may be external of the user's computer. If the PEAD is embedded in a portable requesting device, then the PEAD detection is performed in the portable requesting device.

The executable portion of the TP may also include codes to obtain, through an appropriate input device, the user's identification for authentication. By way of example, the TP may obtain the user's signature, the user's facial image, finger print, voice print, DNA coding sequence through a tissue sample, or other unique biometrics or other unique identifying data. The obtained user's identification facilitates non-repudiation, i.e., it facilitates identification of the identity of the person conducting the transaction so that fraud detection may be improved or deniability may be minimized. Of course some of the identification data may already exist in the PEAD and if such identification data is obtained from the PEAD, the obtained identification may indicate at least that the person performing the transaction on the requesting device also has access to the PEAD.

It should be appreciated, however, that some or all of the executable portion may not need to be downloaded every time and may be loaded once into the requesting device for subsequent use. Of course, the fact that the executable portion of the TP is downloadable, and preferably downloadable with a transaction to be approved, greatly simplifies the task of enabling electronic transactions even when the transaction approval device is updated (e.g., with new technologies), the communication protocol between the transaction approval device and the requesting device changes, or when a new transaction approval device is installed with the requesting device. In these cases, the TP containing the updated codes appropriate for the updated/new transaction device and/or protocol may be downloaded into the requesting device, either automatically with a transaction or upon request by the user, to enable electronic transactions.

For ease of discussion, assume that the requesting device (e.g., the user's computer) is PEAD-enabled. In this case, the TP may communicate with the PEAD, once it has detected the presence of such a device, to obtain approval data, authentication data and/or any other required user-supplied information in accordance with techniques discussed (step 1006 of FIG. 10). By way of example, the TP may employ the communication port in the requesting device for communication with the PEAD. As any of the required user authentication and user-supplied data may be stored in the PEAD, the user's approval, authentication and/or other user-supplied data may be encrypted by the PEAD and transmitted back to the requesting device wherein the TP may employ such data for responding to the transaction request, including transmitting some or all of the encrypted data received from the PEAD back to the server (step 1008 of FIG. 10).

As can be appreciated from the foregoing, the use of the PEAD in conjunction with the TP ensures that the electronic transaction is confidential since the encryption facilities in the PEAD and/or the TP renders the transmission secure. Further, the electronic transaction is more securely authenticated since the user can be authenticated using the identification data within the PEAD (e.g., the aforementioned unique biometrics or unique identifying data such as fingerprint, DNA coding sequence, voice print, or the like).

Likewise, if the requesting device is enabled with another transaction approval device such as a Smart Card reader or a credit card reader, the TP may then request that the user approve, authenticate, and/or supply the requested data using the transaction approval device present (e.g., by inserting the Smart Card or credit card or other similar apparatus into the transaction approval device present), either alone or in combination with other data entry techniques (e.g., clicking on choices present on the screen, typing, speech input, or the like) to complete the transaction data requested.

On the other hand, if the requesting device is not enabled with a transaction approval device, the user may still proceed with the transaction by authenticating, approving and/or supplying the requested data conventionally using any of the aforementioned data entry technique (step 1006 of FIG. 10). The TP will then preferably (but not necessarily) format and/or encrypt the entered data, using, e.g., a public key transcription system, to transmit the transaction data back to the server to complete the transaction (step 1008 of FIG. 10). In this manner, the TP will be backwardly compatible with requesting devices that may not be equipped with a transaction approval device.

Note that since the downloaded TP is, in the preferred embodiment, endowed with encryption facilities, i.e., the encryption codes is included in the downloaded codes in this embodiment, the presence of a general purpose encryption facility (such as the aforementioned SSL) may not be required for secured transmission. In this manner, backward compatibility with requesting devices which are not even equipped with a secured transmission facility (e.g., the aforementioned SSL) while transmission confidentiality is assured. On the other hand, if the requesting device is endowed with the general purpose encryption facility (e.g., the aforementioned SSL), the presence of the encryption codes in the TP may not be required. Of course, it is also possible to encrypt using both the encryption facility of the TP and the general purpose encryption facility (e.g., the aforementioned SSL) together to encrypt data transmitted to the server.

It should be noted, however, a transaction conducted in this manner may be less secure than that conducted with a transaction approval device such as the PEAD since the user's identity may not be authenticated, or verified, to the vendor. Because of this, there may be no guarantee of non-repudiation since a user can later deny having conducted the transaction in question. Along the same line, the data integrity may be less secure since the transaction data may be modified once received at the remote server.

Another implementation of the invention is directed toward a service resevation transaction. In this implementation, the PEAD can perform service reservation, transaction and service authorization all in the same device. For example, the PEAD can perform a hotel reservation through wireless network and Internet and complete the transaction by providing the credit information with electronic signature performed by the PEAD. Once the hotel acknowledges the transaction, the hotel can transmit the service information including room number direction to the hotel, etc. as well as the encrypted electronic room key through the Internet and wireless network to the PEAD. When the user arrives the hotel, he does not need to wait on the line for check-in, but rather can go directly to the room and use the PEAD pre-stored hotel electronic key to open the room door. The PEAD user can also use the PEAD to order room service through the wireless network and Internet. At the end of the stay, the user can check-out through the PEAD and received the electronic bill/receipt over the wireless network and Internet. For example, the user can check-out of the hotel while traveling to the airport to catch a flight.

Similarly, the PEAD can perform the airline ticket reservation through the wireless network and Internet. Once the transaction is completed using the PEAD, the airline can issue the encrypted electronic ticket through the Internet and wireless network to the PEAD. When the PEAD user arrives the airport, after the security clearance, he can go directly to aboard using the PEAD pre-stored electronic ticket to notify the gate counter computer that he is the ticket owner through the wireless network and Internet.

Similarly, the PEAD can be used to reserve theater tickets and receive the encrypted electronic tickets and service information through the wireless network and Internet. The PEAD can be used for rental car reservation, key pickup service, and even to start the car through an equipped Internet controlled ignition system, and car return service.

Or the Supermarket can issue electronic coupons through the Internet and wireless network to the PEAD. When the user shops in the Supermarket, he can present the coupons over the point of sale counter through the wireless network and Internet.

One of the preferred embodiment is using an Internet enabled cellular telephone (e.g. a web phone), a wireless PDA or a wireless two way pager to implement the PEAD to perform the above applications. The description below uses an Internet enabled cellular telephone as example of the implementation, and those skilled in the art will understand that the same or similar method can be applied to wireless PDAs and two way pagers. The Internet enabled cellular phone (web phone) can communicate with the Internet through a wireless network. For example, currently Sprint-PCS provides an Internet phone service using NeoPoint 1000 web phone. The web phone can access the Internet through a wireless gateway, and can contact the hotel's Internet reservation system through the wireless network and Internet. The software and/or firmware controls the PEAD functions running in the web phone is called eSignX Agent (or xAgent for short). xAgent is under the user's control to contact the hotel reservation transaction system. The reservation transaction process includes: (1) the web phone (PEAD) sending out the reservation request (optional using merchant public key [in the example given here, the merchant is the hotel, then it would be the hotel's public key or it's certificate] to encrypt the request; optionally using the user's private key to sign the request); (2) the Merchant acknowledges with the service availability and the cost (optionally, this message can be encrypted using the user's public key and the hotel's private key); (3) once the user approves the transaction, the web phone sends out the transaction confirmation with the credit information and signed by the user's private key (optionally encrypted with the Merchant's public key); (4) once the Merchant validates the transaction, the Merchant sends out the service information as well as the service authorization token (the token could be the electronic room key in the hotel reservation example, the token could be the electronic ticket in the Airline Ticket Reservation and Theater Ticket reservation examples, or the token could be the Supermarket coupon etc. The token is optionally encrypted by the user's public key and Merchant's private key; (5) when the service is rendered, a service authorization token is to be presented over the point of service (example, hotel room door, airport boarding gate, or theater entrance, Supermarket check-out counter or rental car etc.) through the wireless network and Internet; (6) if the service authorization token has been validated at the point of service (e.g. decrypting the token using the Merchant's public key successfully) then, the Merchant can authorize the service (e.g. to open the hotel room, to permit the boarding at the airport gate, to admit entering the theater, to discount the transaction amount, to ignite a car, etc.)

In yet another implementation, called a Point-of-Sale Transaction, the PEAD can perform the Point-of-Sale transaction through the wireless network and Internet. In the future, the Point-of-Sale terminal can access the Internet through an internal network system or through a dial-up phone line, DSL, ADSL, or cable modem, etc. The PEAD can be used as the Point-of-Sale transaction device. At the Point-of-Sale check-out counter, the Point-of-Sale terminal can scan in the merchandise barcodes and generate transaction information as well as generate a unique transaction number (which contains the store number+counter number+ transaction number for example) or a unique ID of the point of sale terminal (e.g. a phone number) to give to the PEAD user to enter into the PEAD (for example the web phone). The user can use the keypad on the PEAD to enter the unique ID of the point of sale terminal or use an alternative input device built into the PEAD such as a barcode scanner or OCR reader to scan in the unique ID of the point of sale terminal. It is also possible to enter the merchandise bar code number to the PEAD through the keypad or scanner on the PEAD and generate transaction information from the PEAD rather than generate the transaction information from the point of sale terminal. Then the PEAD can use this unique transaction number or a unique ID of the point of sale terminal to establish the communication link with the Point-of-Sale system through the wireless network and Internet to conduct the transaction. Or, the user can give the Point-of-Sale counter the unique PEAD ID (e.g. a cellular phone number) to enter into the Point-of-Sale terminal or the Merchant can use the scanner (e.g. barcode scanner or OCR scanner) to scan in the PEAD ID that is attached on the external case of the PEAD in barcode and/or human readable format to establish the communication link with the PEAD through the Internet and wireless network to conduct the transaction. This identification process (or link-up process) can be automated through local wireless port for example: the infrared port or a Bluetooth (short range wireless RF) port. Alternately, the PEAD can be equipped with a GPS system, then the PEAD can search automatically the closest Point-of-Sale terminal according to GPS geometry position and establish the link automatically by using a Location-ID mapping table that maps the proximity of the point of sale terminal location to the unique ID of the point of sale terminal. Once the link between the PEAD and Point-of-Sale terminal is established, the PEAD can display the transaction information including the price, items, etc., and if the user agrees to pay, he will press the approve button to authorize the transaction. The user approval process and transaction process using the PEAD is also described in U.S. Ser. No. 09/067,176 and U.S. Ser. No. 08/759,555, now U.S. Pat. No. 5,917,913.

In an aspect of the invention, if the Point-of-Sale terminal also has short range wireless communication capability such as Bluetooth and infrared communication port, the described transaction can be conducted locally through PEAD's Bluetooth port or infrared port using the same method.

It is also possible to use an ordinary cellular phone not necessarily having web capability to perform both above Service Reservation Transaction and Point-of-Sale Transaction by using a remote voice activated or touch tone server. For example, this is called an Agent Server. The Agent server functions exactly likes the PEAD in a Web phone except it is not necessarily portable. It operates through the existing voice activated or touch tone interfacing with the end user through the existing phone network. Once the user registers an xAgent in the Agent Server, the ordinary cellular phone end user can enjoy all the same functionality as the Web phone user. For example, the end user can use the ordinary cellular phone to dial in to the Agent Server to activate his own xAgent by entering his xAgent password through voice activated interface or touch tone interface. Once xAgent is activated, it can reserve a hotel room, order tickets, pay at a point-of-sale counter through the Agent Server, just as if it were running on a Web phone. For example, the end user can reserve the a hotel room, once the xAgent gets the approval from the user's cellular phone, the xAgent running on the Agent Server can exchange the credit information pre-stored in the xAgent and sign the transaction. The hotel can issue the electronic room key to the xAgent in the Agent Server just the same as to the PEAD. When the end user arrives at the hotel, he can dial the Agent Server number to request to activate the electronic room key stored in the xAgent to open the door through the Internet. Similarly, all other applications that can be conducted through a Web phone, can also be conducted by the ordinary cellular phone plus the remote running xAgent in the Agent Server.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for approving a transaction request between an electronic transaction system and a portable electronic authorization device carried by a user using an electronic service authorization token, comprising steps of:
   receiving at the portable electronic authorization device first digital data representing the transaction request;
   providing information to the user regarding an ability to approve the transaction request; and
   when the transaction request is approved by the user, receiving at the portable electronic authorization device second digital data representing the electronic service authorization token.

2. The method of claim 1, wherein the electronic service authorization token can be one of the following: an electronic hotel room key, an electronic airline ticket, an electronic theater ticket, an electronic car key, and an electronic coupon.

3. The method of claim 1, wherein the electronic service authorization token can be encrypted by the to ken issuer's private key.

4. The method of claim 3, wherein the token issuer can be one of the following: a hotel, an airline, a movie theater, a supermarket, a car rental service and a merchant.

5. The method of claim 1, wherein the receiving at the portable electronic authorization device second digital data representing the electronic service authorization token is performed via a wireless communication port associated with the portable electronic authorization device.

6. A portable electronic authorization device for approving a transaction request with an electronic transaction system, using an electronic service authorization token, comprising:

a receiver in the portable electronic authorization device configured to receive first digital data representing the transaction request;

a display configured to provide information to the user regarding an ability to approve the transaction request; and wherein the receiver is further configured such that when the transaction request is approved by the user, the receiver is configured to receive second digital data representing the electronic service authorization token.

7. The portable electronic authorization device of claim 6, wherein the electronic service authorization token can be one of the following: an electronic hotel room key, an electronic airline ticket, an electronic theater ticket, an electronic car key, and an electronic coupon.

8. The portable electronic authorization device of claim 6, wherein the electronic service authorization token can be encrypted by the token issuer's private key.

9. The portable electronic authorization device of claim 8, wherein the token issuer can be one of the following: a hotel, an airline, a movie theater, a supermarket, a car rental service and a merchant.

10. The portable electronic authorization device of claim 6, wherein the receiver is a wireless receiver.

11. The portable electronic authorization device of claim 6, wherein the portable electronic authorization device is a cellular phone.

12. The portable electronic authorization device of claim 6, wherein the portable electronic authorization device is a two-way pager.

13. The portable electronic authorization device of claim 6, wherein the portable electronic authorization device is a wireless device.

14. The portable electronic authorization device of claim 6, wherein the electronic transaction system is a service reservation system.

15. The portable electronic authorization device of claim 6, wherein the electronic transaction system is a point of sale system.

16. The portable electronic authorization device of claim 6, wherein the electronic transaction system is a ticket reservation system.

17. The portable electronic authorization device of claim 6, wherein the portable electronic authorization device is an Internet enabled cellular phone.

18. A method for rendering a service between an electronic transaction system and portable electronic authorization device carried by a user using an electronic service authorization token, comprising steps of:

transmitting at the portable electronic authorization device to the electronic transaction system first digital data representing the service authorization token;

validating at the electronic transaction system the first digital data representing the service authorization token; and authorizing the service at the electronic transaction system if the first digital data representing the service authorization token is valid.

19. The method of claim 18, wherein the electronic service authorization token can be one of the followings: an electronic hotel room key, an electronic airline ticket, an electronic theater ticket, an electronic coupon.

20. The method of claim 18, wherein the electronic service authorization token can be encrypted by the token issuer's private key.

21. The method of claim 18, wherein the validating step includes decrypting the first digital data representing the service authorization token using token issuer's public key.

22. The method of claim 20, wherein the token issuer can be one of the followings: a hotel, an airline, a movie theater, a supermarket, a merchant.

23. The method of claim 18, wherein the transmitting the electronic service authorization token is performed via a wireless communication port associated with the portable electronic authorization device.

24. The method of claim 18, wherein the authorizing step includes one of the the services: opening the hotel room, admittance of theater, boarding the airplane, discounting the transaction amount, igniting a car.

25. A method for approving a transaction request between an electronic transaction system and portable electronic authorization device carried by a user using an electronic service authorization token via a remote agent server, comprising steps of:

receiving at the remote agent server first digital data representing the transaction request;

providing information at the remote agent server via the portable electronic authorization device to user regarding an ability to approve the transaction request; and when the transaction request is approved by the user, receiving at the remote agent server second digital data representing the electronic service authorization token.

26. The method of claim 25, wherein the electronic service authorization token can be one of the following:

an electronic hotel room key, an electronic airline ticket, an electronic theater ticket, an electronic car key, an electronic coupon.

27. The method of claim 25, wherein the electronic service authorization token can be encrypted by the token issuer's private key.

28. The method of claim 27, wherein the token issuer can be one of the followings: a hotel, an airline, a movie theater, a supermarket, a car rental service, a merchant.

29. The method of claim 25, wherein the receiving at the remote agent server second digital data representing the electronic service authorization token is performed via Internet.

30. The method of claim 25, wherein the providing information at the remote agent server via the portable electronic authorization device step includes converting the first digital data representing the transaction request to a audio format.

31. The method of claim 25, wherein the portable electronic authorization device is a cellular phone.

32. The method of claim 25, wherein the transaction request approval by the user step includes entering a password to the remote agent server via the portable electronic authorization device.

33. A portable electronic authorization device for approving a transaction request with an electronic transaction system, using an electronic service authorization token via a remote agent server, comprising:

an Internet connection at the remote agent server configured to receive first digital data representing the transaction request;

a receiver in the portable electronic authorization device configured to receive from the remote agent server and to provide to the user information regarding an ability to approve a transaction request; and wherein the Internet connection is further configured such that when the transaction request is approved by the user, the Internet connection is configured to receive second digital data representing the electronic service authorization token.

34. The portable electronic authorization device of claim 33, wherein the electronic service authorization token can be one of the following: an electronic hotel room key, an electronic airline ticket, an electronic theater ticket, an electronic car key, and an electronic coupon.

35. The portable electronic authorization device of claim 33, wherein the electronic service authorization token can be encrypted by the token issuer's private key.

36. The portable electronic authorization device of claim 35, wherein the token issuer can be one of the following: a hotel, an airline, a movie theater, a supermarket, a car rental service and a merchant.

37. The portable electronic authorization device of claim 33, wherein the receiver is a wireless receiver.

38. The portable electronic authorization device of claim 33, wherein the portable electronic authorization device is a cellular phone.

39. The portable electronic authorization device of claim 33, wherein the portable electronic authorization device is a two-way pager.

40. The portable electronic authorization device of claim 33, wherein the portable electronic authorization device is a wireless device.

41. The portable electronic authorization device of claim 33, wherein the electronic transaction system is a service reservation system.

42. The portable electronic authorization device of claim 33, wherein the electronic transaction system is a point of sale system.

43. The portable electronic authorization device of claim 33, wherein the electronic transaction system is a ticket reservation system.

44. The portable electronic authorization device of claim 33, wherein the portable electronic authorization device is an Internet enabled cellular phone.

45. A method for rendering a service between an electronic transaction system and a portable electronic authorization device carried by a user using an electronic service authorization token via a remote agent server, comprising steps of:

activating the remote agent server via the portable electronic authorization device;

transmitting at the remote agent server to the electronic transaction system first digital data representing the service authorization token;

validating at the electronic transaction system the first digital data representing the service authorization token; and authorizing the service at the electronic transaction system if the first digital data representing the service authorization token is valid.

46. The method of claim 45, wherein the electronic service authorization token can be one of the followings: an electronic hotel room key, an electronic airline ticket, an electronic theater ticket, an electronic coupon.

47. The method of claim 45, wherein the electronic service authorization token can be encrypted by the token issuer's private key.

48. The method of claim 45, wherein the activating step includes entering password to the remote agent server via the portable electronic authorization device.

49. The method of claim 45, wherein the validating step includes decrypting the first digital data representing the service authorization token using token issuer's public key.

50. The method of claim 47, wherein the token issuer can be one of the followings: a hotel, an airline, a movie theater, a supermarket, a car rental service, a merchant.

51. The method of claim 45, wherein the transmitting the electronic service authorization token is performed via Internet.

52. The method of claim 45, wherein the authorizing step includes one of the services: opening the hotel room, admittance of theater, boarding the airplane, discounting the transaction amount, igniting a car.

53. A method for approving a transaction request between an electronic point of sale transaction system and a portable electronic authorization device carried by a user, comprising the steps of:

receiving at portable electronic authorization device at a point of sale location a first digital data representing the transaction request;

providing information to the user regarding an ability to approve the transaction request;

when the transaction request is approved by the user, encrypting transaction approval data as second digital data representing approval by the user to purchase the item at the point of sale location; and transmitting the second digital data to the electronic transaction system to approve the transaction request with the electronic transaction system.

54. The method of claim 53, wherein the encrypting the approval data is performed using a public key cryptography technique.

55. The method of claim 53, wherein the receiving step includes establishing the communication link between the portable electronic authorization device and the electronic point of sale transaction system via the wireless network and Internet.

56. The method of claim 55, wherein the establishing the communication link step includes entering the unique ID of the electronic point of sale transaction system to the portable electronic authorization device.

57. The method of claim 56, wherein the entering the unique ID step includes using the keypad of the portable electronic authorization device to enter the unique ID of the electronic point of sale transaction system.

58. The method of claim 56, wherein the entering the unique ID step includes using the scanner of the portable electronic authorization device to enter the unique ID of the electronic point of sale transaction system.

59. The method of claim 55, wherein the establishing the communication link step includes entering the unique ID of the portable electronic authorization device to the electronic point of sale transaction system.

60. The method of claim 59, wherein the entering the unique IDstep includes using the keypad of the electronic point of sale transaction system to enter the unique ID of the portable electronic authorization device.

61. The method of claim 59, wherein the entering the unique ID step includes using the scanner of the electronic point of sale transaction system to enter the unique ID of the portable electronic authorization device.

62. The method of claim 55, wherein the establishing the communication link step includes automatically identifying the proximity of the location of the electronic point of sale transaction system by using the GPS of the portable electronic authorization device.

63. The method of claim 59, wherein the unique ID of the portable electronic authorization device is a cellular phone number.

64. The method of claim 53, wherein the receiving step includes establishing the communication link between the portable electronic authorization device and the electronic point of sale transaction system via infrared.

65. The method of claim 53, wherein the receiving step includes establishing the communication link between the portable electronic authorization device and the electronic point of sale transaction system via short range RF.

66. A portable electronic authorization device for approving a transaction request with an electronic point of sale transaction system, comprising:
 a receiver in the portable electronic authorization device configured to receive first digital data representing the transaction request;
 a display configured to provide information to the user regarding an ability to approve the transaction request;
 when the transaction request is approved by the user, the portable electronic authorization device is configured to encrypt the transaction approval data as second digital data representing approval by the user to purchase the item at the point of sale location; and
 a transmitter configured to transmit the second digital data to the electronic transaction system to approve the transaction request with the electronic transaction system.

67. A method for approving a transaction request between an electronic point of sale transaction system and a portable electronic authorization device carried by a user via a remote agent server, comprising the steps of:
 receiving at the remote agent server at a point of sale location a first digital data representing the transaction request;
 providing information at the remote agent server via the portable electronic authorization device to user regarding an ability to approve the transaction request;
 when the transaction request is approved by the user via the portable electronic authorization device, encrypting transaction approval data at the remote agent server as second digital data representing approval by the user to purchase the item at the point of sale location; and
 transmitting the second digital data at the remote agent server to the electronic transaction system to approve the transaction request with the electronic transaction system.

68. The method of claim 67, wherein the encrypting the approval data is performed using a public key cryptography technique.

69. The method of claim 67, wherein the receiving step includes establishing the communication link between the portable electronic authorization device and the electronic point of sale transaction system via the wireless network and Internet.

70. The method of claim 69, wherein the establishing the communication link step includes entering the unique ID of the electronic point of sale transaction system to the portable electronic authorization device.

71. The method of claim 70, wherein the entering the unique ID step includes using the keypad of the portable electronic authorization device to enter the unique ID of the electronic point of sale transaction system.

72. The method of claim 69, wherein the establishing the communication link step includes entering the unique ID of the portable electronic authorization device to the electronic point of sale transaction system.

73. The method of claim 72, wherein the entering the unique ID step includes using the keypad of the electronic point of sale transaction system to enter the unique ID of the portable electronic authorization device.

74. The method of claim 72, wherein the entering the unique ID step includes using the scanner of the electronic point of sale transaction system to enter the unique ID of the portable electronic authorization device.

75. The method of claim 72, wherein the unique ID of the portable electronic authorization device is a cellular phone number.

76. A portable electronic authorization device for approving a transaction request with an electronic point of sale transaction system, using a remote agent server, comprising:
 an internet connection at the remote agent server configured to receive first digital data representing the transaction request;
 a receiver in the portable electronic authorization device configured to receive from the remote agent server and to provide to the user information regarding an ability to approve a transaction request; and
 when the transaction request is approved by the user via the portable electronic authorization device, the remote agent server is configured to encrypt the transaction approval data as second digital data representing approval by the user to purchase the item at the point of sale location; and
 wherein the Internet connection is further configured to transmit the second digital data at the remote agent server to the electronic transaction system to approve the transaction request with the electronic transaction system.

* * * * *